(12) United States Patent
Kim et al.

(10) Patent No.: US 9,189,057 B2
(45) Date of Patent: *Nov. 17, 2015

(54) ADAPTIVE REAL-TIME POWER AND PERFORMANCE OPTIMIZATION OF MULTI-CORE PROCESSORS

(71) Applicant: International Business Machines Corporation, Armonk, NY (US)

(72) Inventors: Daeik Kim, San Diego, CA (US); Jonghae Kim, San Diego, CA (US); Moon J. Kim, Wappingers Falls, NY (US); James R. Moulic, Anchorage, AK (US)

(73) Assignee: International Business Machines Corporation, Armonk, NY (US)

( * ) Notice: Subject to any disclaimer, the term of this patent is extended or adjusted under 35 U.S.C. 154(b) by 12 days.

This patent is subject to a terminal disclaimer.

(21) Appl. No.: 14/041,065

(22) Filed: Sep. 30, 2013

(65) Prior Publication Data
US 2014/0025972 A1 Jan. 23, 2014

Related U.S. Application Data

(63) Continuation of application No. 11/946,522, filed on Nov. 28, 2007, now Pat. No. 8,578,193.

(51) Int. Cl.
*G06F 1/32* (2006.01)
(52) U.S. Cl.
CPC . *G06F 1/324* (2013.01); *G06F 1/32* (2013.01)
(58) Field of Classification Search
CPC .............................. G06F 1/324; G06F 1/3296
USPC .................................................. 713/320, 322
See application file for complete search history.

(56) References Cited

U.S. PATENT DOCUMENTS

| | | |
|---|---|---|
| 5,903,182 A | 5/1999 | Jordan |
| 8,037,340 B2 | 10/2011 | Kim et al. |
| 8,148,953 B2 | 4/2012 | Cho et al. |

(Continued)

OTHER PUBLICATIONS

Deniz, Z.T. et al., "Configurable On-Line Global Energy Optimization in Multi-Core Embedded Systems Using Principles of Analog Computaton", 2006 IFIP International Conference on Oct. 16-18, 2006, pp. 379-384.

(Continued)

*Primary Examiner* — Kim Huynh
*Assistant Examiner* — Brandon Kinsey
(74) *Attorney, Agent, or Firm* — Noah A. Sharkan; Keohane & D'Alessandro PLLC; Hunter E. Webb

(57) ABSTRACT

An apparatus, method, and program product for optimizing core performance and power in a multi-core processor. The apparatus includes a multi-core processor coupled to a clock source providing a clock frequency to one or more cores, an independent power supply coupled to each core for providing a supply voltage to each core and a Phase-Locked Loop (PLL) circuit coupled to each core for dynamically adjusting the clock frequency provided to each core. The apparatus further includes a controller coupled to each core and being configured to collect performance data and power consumption data measured for each core and to adjust, using the PLL circuit, a supply voltage provided to a core, such that, the operational core frequency of the core is greater than a specification core frequency preset for the core and, such that, core performance and power consumption is optimized.

18 Claims, 10 Drawing Sheets

(56) References Cited

U.S. PATENT DOCUMENTS

| | | | |
|---|---|---|---|
| 2003/0071657 A1 | 4/2003 | Soerensen et al. | |
| 2005/0050373 A1 | 3/2005 | Orenstein et al. | |
| 2005/0154931 A1 | 7/2005 | Oh | |
| 2005/0218955 A1 | 10/2005 | Kurd et al. | |
| 2006/0026447 A1 | 2/2006 | Naveh et al. | |
| 2006/0059377 A1 | 3/2006 | Sherburne | |
| 2006/0271797 A1 | 11/2006 | Ginggen et al. | |
| 2006/0282692 A1 | 12/2006 | Oh | |
| 2006/0288243 A1 | 12/2006 | Kim | |
| 2007/0074011 A1 | 3/2007 | Borkar et al. | |
| 2007/0118773 A1 | 5/2007 | Tsuji | |
| 2007/0174698 A1* | 7/2007 | Bailey et al. | 714/22 |
| 2007/0262132 A1* | 11/2007 | Burton et al. | 235/375 |
| 2008/0244294 A1 | 10/2008 | Allarey | |

OTHER PUBLICATIONS

Meng, K. et al., "Modeling and Characterizing Power Variability in Multicore Architectures", Performance Analysis of Systems & Software, 2007, ISPASS 2007, IEEE International Symposium on Apr. 25-27, 2007, pp. 146-157.

Donald, J. et al., "Techniques for Multicore Thermal Management: Classification and New Exploration", Proceedings of the 33rd International Symposium on Computer Architecture (ISCA '06), pp. 78-88.

Donald, J. et al., "Power Efficiency for Variation-Tolerant Multicore Processors", ISLPED '06, Proceedings of the 2006 International Symposium on Oct. 4-6, 2006, pp. 304-309, Tegernsee, Germany.

Marowka, A., "Routing Speedup in Multicore-Based Ad Hoc Networks", 2007, ISPDC '07, Sixth International Symposium on Parallel and Distributed Computing (ISPDC'07), Jul. 5-8, 2007, pp. 45-52.

Brandon Michael Kinsey, USPTO Office Action, U.S. Appl. No. 11/946,522, Mail Date Dec. 22, 2010, 17 pages.

Brandon Michael Kinsey, USPTO Office Action, U.S. Appl. No. 11/946,522, Mail Date Apr. 12, 2011, 13 pages.

Brandon Michael Kinsey, USPTO Final Office Action, U.S. Appl. No. 11/946,522, Mail Date Oct. 31, 2011, 14 pages.

Brandon Michael Kinsey, USPTO Office Action, U.S. Appl. No. 11/946,522, Mail Date Feb. 28, 2013, 18 pages.

Brandon Michael Kinsey, USPTO Notice of Allowance and Fee(s) Due, U.S. Appl. No. 11/946,522, Mail Date Jun. 26, 2013, 21 pages.

* cited by examiner

ADAPTIVE REAL-TIME POWER AND PERFORMANCE OPTIMIZATION OF MULTI-CORE PROCESSORS

CROSS-REFERENCE TO RELATED APPLICATION

This application is a continuation of, and claims the benefit of, co-pending and co-owned U.S. patent application Ser. No. 11/946,522, filed Nov. 28, 2007, and, the entire contents of which are herein incorporated by reference.

FIELD OF THE INVENTION

The present invention relates to the field of electronic components, and more particularly to an apparatus, method, and program product for adaptive real-time power and performance optimization of multi-core processors.

BACKGROUND OF THE INVENTION

Current microprocessor chips with multiple cores typically use a single power supply voltage and a fixed clock frequency for the multiple cores on a chip. Given wafer-level and die-level process variations in microprocessor chip manufacturing one core on a microprocessor chip can have different performance characteristics than another core on the chip, which can result in low processor chip yield due to the fact that some cores do not perform faster than a given frequency specification required for all cores on a chip. As the number of cores on a chip increase, the chip yield becomes a critical bottleneck for microprocessor chip manufacturing. As such, there is a need for a cost effective and efficient way to improve microprocessor chip yield during manufacturing.

SUMMARY OF THE INVENTION

In a first aspect of the invention, there is provided an apparatus for optimizing performance and power consumption of a multi-core processor, comprising: a main controller; a multi-core processor including a plurality of cores, said multi-core processor being coupled to a clock source configured to provide a reference input clock frequency to said plurality of cores in said multi-core processor, each of said cores of said plurality of cores having a specification core frequency preset for said multi-core processor, and each of said cores of said plurality of cores being connected to separate supply voltage sources, the separate supply voltage being connected, in parallel, to said main controller and a voltage level-translating communication transceiver to allow individual adjustment of the separate supply voltage sources, by said main controller, for each of said cores of said plurality of cores; said supply voltage sources, wherein said plurality of cores has a respective operational core frequency that is proportional to said supply voltage provided by said respective supply voltage source; and said main controller coupled to said plurality of cores, said main controller being configured to adjust either of: said supply voltage provided by said supply voltage source connected to said respective core, and said reference input clock frequency provided to said respective core, wherein adjustment of either said supply voltage provided or said respective input clock frequency provided to said respective core optimizes a respective core performance and a respective core power consumption by said respective core, and wherein said main controller dynamically adjusts said supply voltage provided by said supply voltage source to said plurality of cores in real-time.

In another aspect of the invention, there is provided an apparatus for compensating semiconductor manufacturing process-induced variation in core performance of a multi-core processor, comprising: a main controller; a multi-core processor including a plurality of cores, said multi-core processor being coupled to a clock source configured to provide a reference input clock frequency to said plurality of cores in said multi-core processor, each of said plurality of cores of said multi-core processor being connected to a separate supply voltage source, the separate supply voltage source being connected, in parallel, to said main controller and a voltage level-translating communication transceiver to allow individual adjustment of the separate supply voltage sources, by said main controller, for each of said cores of said plurality of cores; a respective power supply voltage coupled to a respective core of said plurality of cores for providing a respective supply voltage to said respective core; wherein a respective operational core frequency of said respective core is proportional to said respective supply voltage provided by said respective power supply voltage; and wherein said main controller is configured to adjust said respective supply voltage provided to said respective core in order to ensure that said respective operational core frequency of said respective core is greater than a specification core frequency preset for said respective core and to optimize said power consumption by said respective core.

In another aspect of the invention, there is provided a method for optimizing performance and power consumption of a multi-core processor, said method comprising the steps of: providing a multi-core processor having a plurality of cores, said multi-core processor receiving a reference input clock frequency to said plurality of cores in said multi-core processor; connecting, in parallel, a separate supply voltage for each core of said plurality of cores to a same controller and a voltage level-translating communication transceiver, wherein the same controller and the voltage level-translating communication transceiver are configured to control a respective supply voltage to said each core of said plurality of cores in said multi-core processor, wherein a respective core operational clock frequency is proportional to said respective supply voltage provided to a respective core, and wherein a respective core power consumption by said respective core is proportional to said reference input clock frequency and to said respective supply voltage squared; and adjusting, using said main controller, either of: said respective supply voltage provided to said respective core of said plurality of cores, and said reference input clock frequency provided to said respective core of said plurality of cores, based on a respective core performance data and a respective core power consumption data collected for said respective core of said plurality of cores, wherein adjustment of said respective power provided to said respective core ensures that said respective operational core frequency of said respective core is greater than a respective specification core frequency preset for said respective core, and wherein adjustment of said reference input clock frequency ensures that said respective operational core frequency of said respective core is at least equal to said reference input clock frequency.

BRIEF DESCRIPTION OF THE DRAWINGS

The accompanying drawings, which are incorporated in and form a part of this specification, illustrate embodiments of the invention and, together with the description, serve to explain the principles of the invention:

FIGS. 5B-5D are graphs illustrating an example of adjusting the supply voltage to provide maximum operational power or performance in a multi-core processor, in accordance with an embodiment of the invention.

DETAILED DESCRIPTION OF THE INVENTION

Figure 1:
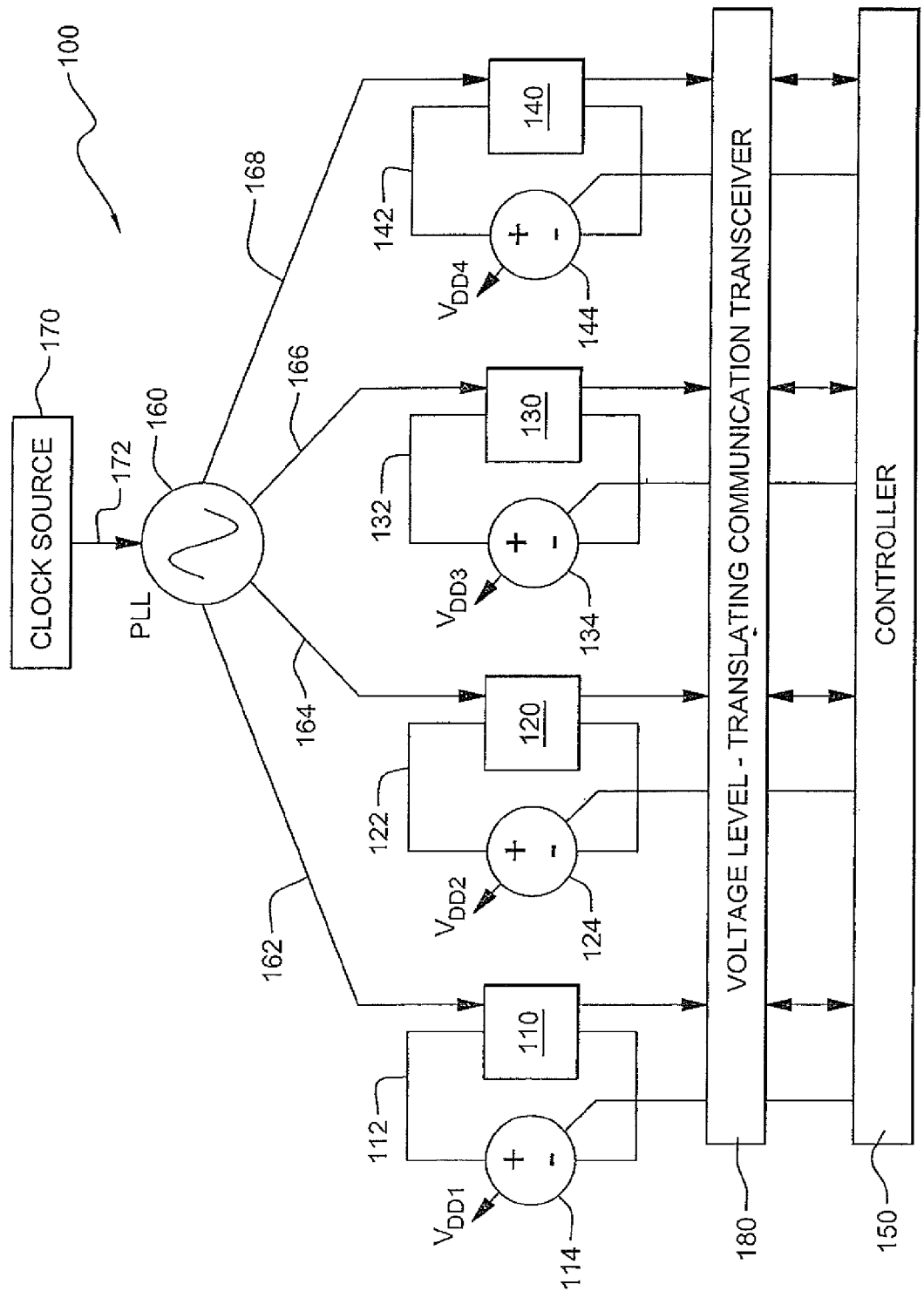
FIG. 1 is a schematic block diagram of an apparatus for optimizing performance and power consumption of a multi-core processor, in accordance with an embodiment of the invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like. Modules may also be implemented in software for execution by various types of processors. An identified module or component of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Further, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, over disparate memory devices, and may exist, at least partially, merely as electronic signals on a system or network. Furthermore, modules may also be implemented as a combination of software and one or more hardware devices. For instance, a module may be embodied in the combination of a software executable code stored on a memory device. In a further example, a module may be the combination of a processor that operates on a set of operational data. Still further, a module may be implemented in the combination of an electronic signal communicated via transmission circuitry.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents. Reference will now be made in detail to the preferred embodiments of the invention.

In one embodiment, the present invention provides an apparatus for optimizing performance and power consumption of a multi-core processor. The apparatus comprises a multi-core processor having a plurality of cores, the multi-core processor being coupled to a clock source configured to provide a reference input clock frequency to the plurality of cores in the multi-core processor, each of the cores of the plurality of cores having a specification core frequency preset for the multi-core processor. The apparatus further comprises at least one power supply voltage connected to the multi-core processor for providing a supply voltage to the plurality of cores, a respective core of the plurality of cores having a respective operational core frequency that is proportional to the supply voltage provided by at least one power supply voltage, at least one PLL (Phase Locked Loop) having one or more voltage-controlled oscillators (VCOs) and one or more dividers, the one PLL being coupled to the multi-core processor and being configured to dynamically adjust the reference input clock frequency provided to a respective core of the plurality of cores to ensure that a respective operational core frequency of the respective core is at least equal to the reference input clock frequency. The apparatus further comprises a main controller coupled to the plurality of cores, the main controller being configured to collect core performance data and core power consumption data measured for the plurality of cores, the main controller being configured to adjust either the supply voltage provided by at least one power supply voltage connected to the respective core or being configured to adjust the reference input clock frequency provided to the respective core, wherein adjustment of either the supply voltage provided or the respective input clock frequency provided to the respective core optimizes a respective core performance and a respective core power consumption by the respective core, and wherein the main controller dynamically adjusts the supply voltage provided by at least one power supply voltage to the plurality of cores in real-time mode. The apparatus further comprises a voltage level-translating communication transceiver configured to enable communications between the main controller and the plurality of cores and configured to enable communications between each of the plurality of cores. In an embodiment, the apparatus further comprises at least two PLLs (Phase Locked Loops) coupled to the multi-core processor, each of the at least two PLLs having one or more voltage-controlled oscillators (VCOs) and one or more dividers, a PLL of the at least two PLLs being configured to dynamically adjust the reference input clock frequency supplied to one or more cores of the plurality of cores in order to ensure that a respective operational core frequency of the respective core is greater than the specification core frequency preset for the respective core. In an embodiment, the apparatus further comprises a plurality of power supply voltages connected to the multi-core processor, a respective individual power supply voltage of the plurality of power supply voltages being configured to provide a respective supply voltage to an individual core of the plurality of cores, wherein the main controller dynamically adjusts the respective supply voltage provided by the respective individual power supply voltage to the individual core to increase the respective operational core frequency of the respective core, and wherein the main controller dynamically adjusts the respective supply voltage provided by the respective individual power supply voltage to the individual core in real-time mode. In an embodiment, the main controller is configured to distribute instruction blocks to the plurality of cores in a manner that achieves a balancing criterion with respect to the plurality of cores, wherein the balancing criterion comprises at least one of: equal performance balancing, maximum performance balancing, power consumption balancing and instruction count balancing. In an embodiment, the core performance data measured for the multi-core processor comprises computing a sum of a respective core performance data measured for each core of the plurality of cores, and wherein the core power consumption data measured for the multi-core processor comprises computing a sum of a respective core power consumption data measured for each core of the plurality of cores.

In another aspect of the invention, there is provided an apparatus for compensating semiconductor manufacturing process-induced variation in core performance of a multi-core processor. The apparatus comprises a multi-core processor including a plurality of cores, the multi-core processor being coupled to a clock source configured to provide a reference input clock frequency to the plurality of cores in the multi-core processor, a respective power supply voltage coupled to a respective core of the plurality of cores for providing a respective supply voltage to the respective core, wherein a respective operational core frequency of the respective core is proportional to the respective supply voltage provided by the respective power supply voltage, a phase locked loop (PLL) circuit coupled to each core of the plurality of cores, the PLL circuit having one or more voltage-controlled oscillators (VCOs) and one or more dividers, the PLL circuit being configured to dynamically adjust the reference input clock frequency provided to the respective core of the plurality of cores, and a main controller coupled to each core of the plurality of cores, the main controller being configured to collect core performance data and core power consumption data measured for each core of the plurality of cores, the main controller being configured to adjust, using the PLL circuit coupled to the respective core, the respective supply voltage provided to the respective core in order to ensure that the respective operational core frequency of the respective core is greater than a specification core frequency preset for the respective core and to optimize the power consumption by the respective core, wherein core performance of the respective core is optimized. The apparatus further comprises a voltage level-translating communication transceiver configured to enable communications between the main controller and the plurality of cores and configured to enable communications between each of the plurality of cores. In an embodiment, the PLL circuit further comprises one or more voltage-controlled oscillators (VCOs) and one or more dividers, the PLL circuit being configured to dynamically adjust the reference input clock frequency provided to the respective core to ensure that the respective operational core frequency of the respective core is at least equal to the reference input clock frequency. In an embodiment, the main controller dynamically adjusts the respective supply voltage provided by the respective power supply voltage to the respective core in real-time mode. In an embodiment, the main controller is configured to distribute instruction blocks to the plurality of cores in a manner that achieves a balancing criterion with respect to the plurality of cores, and wherein the balancing criterion comprises at least one of: equal performance balancing, maximum performance balancing, power consumption balancing and instruction count balancing. In an embodiment, the core performance data measured for the multi-core processor comprises computing a sum of the respective core performance data measured for each core of the plurality of cores and, in an embodiment, the core power consumption data measured for the multi-core processor comprises computing a sum of a respective core power consumption data measured for each core of the plurality of cores.

Figure 2:
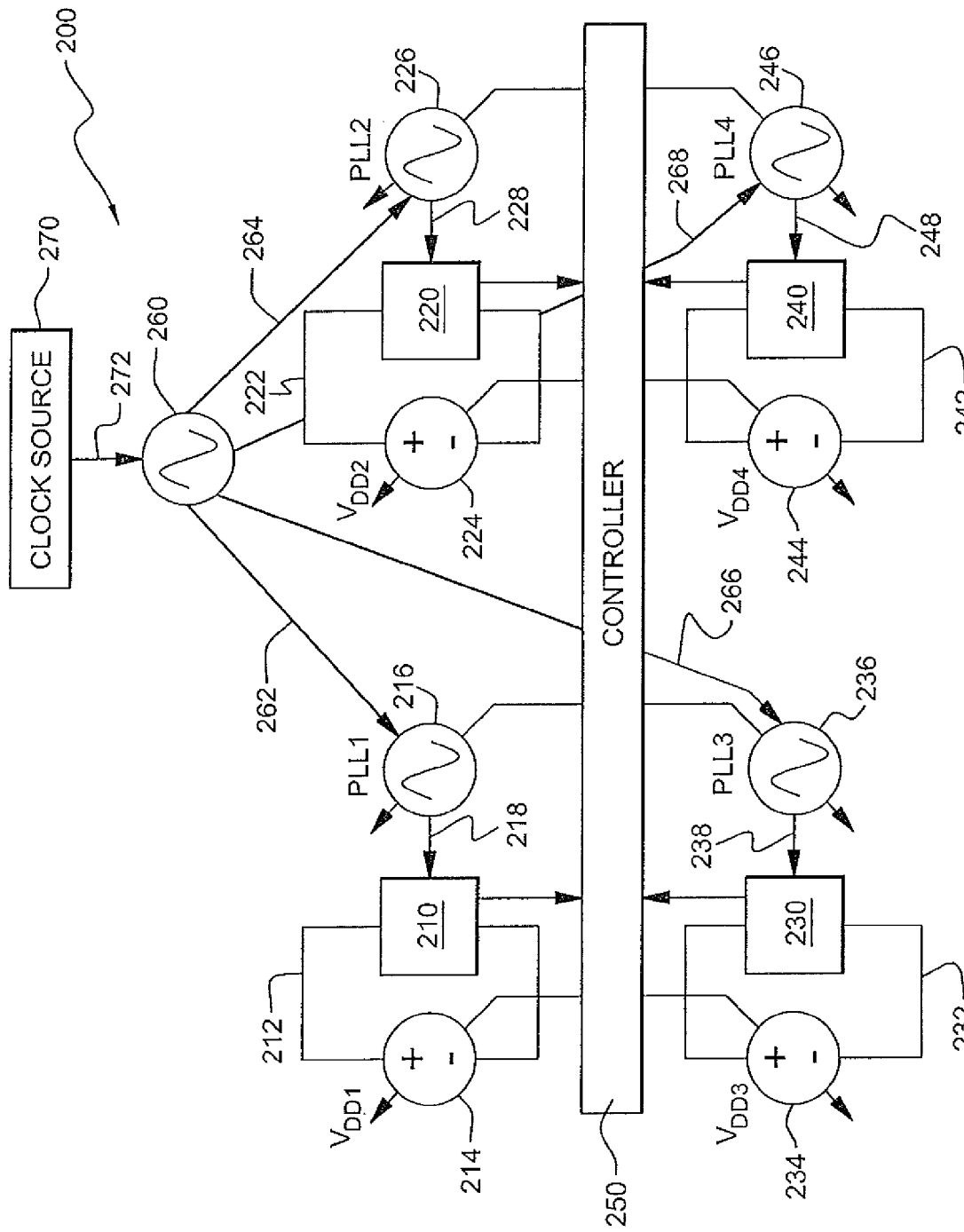
FIG. 2 is a schematic block diagram of an apparatus for optimizing performance and power consumption of a multi-core processor, in accordance with an embodiment of the invention.

Reference is now made to FIGS. 1 and 2, which depict various embodiments of an apparatus for optimizing performance and power consumption in a multi-core processor. Turning to FIG. 1, reference numeral 100 depicts an embodiment of an apparatus comprising of a multi-core processor having a plurality of cores 110, 120, 130 and 140, where each of the cores 110, 120, 130 and 140 is coupled to a main controller or main control core 150, discussed further herein below with respect to FIG. 2, and each core K is connected to its own separate power supply voltage ($V_{DDK}$). In particular, as shown in FIG. 1, core 110 is connected via wiring 112 to its own separate power supply voltage ($V_{DD1}$), reference numeral 114, whereas, core 120 is connected via wiring 122 to its own separate power supply voltage ($V_{DD2}$), reference numeral 124. In a similar manner, core 130 is connected via wiring 132 to its own separate power supply voltage ($V_{DD3}$), reference numeral 134 and core 140 is connected via wiring 142 to its own separate power supply voltage ($V_{DD4}$), reference numeral 144. In an embodiment, each of the respective wiring 112, 122, 132 and 142 is comprised of inductors, capacitors and resistors. In an embodiment, each of the power supply voltages 114, 124, 134 and 144 is also coupled to the controller 150. Further, each of the cores 110, 120, 130 and 140 and each of the power supply voltages 114, 124, 134 and 144 are connected to a voltage level-translating communication transceiver 180, that is configured to enable communication between the main controller 150 and each of the cores 110, 120, 130 and 140 as well as is configured to enable communications between and among each of the cores 110, 120, 130 and 140 in the multi-core processor. Further, in an embodiment, the multi-core processor is coupled to a main PLL (Phase-Locked Loop), reference numeral 160 that is configured to receive (indicated by arrow 172) an input clock frequency or clock rate or speed ($F_{CLK}$) from a clock source (reference numeral 170), such as, a crystal oscillator. In an embodiment, the main PLL 160 comprises a voltage-controlled oscillator (VCO), one or more frequency dividers (preferably, at least one divider for each core in the multi-core processor), a phase detector or phase-frequency detector and a low-pass filter configured in a feedback loop for multiplying the input clock frequency received from the clock source in order to provide a reference input clock frequency that is delivered to each of the cores in the multi-core processor. The main PLL 160 comprises at least four dividers, one divider coupled to each of the respective cores 110, 120, 130 and 140, such that, a respective reference input clock frequency (indicated by arrows 162, 164, 166 and 168) is provided to each of the cores in the multi-core processor. For instance, if the input reference clock frequency ($F_{CLK}$) received from the clock source 170, such as a crystal oscillator is 100 MHz (megahertz), the main PLL 160 may be configured to adjust the input reference clock frequency ($F_{CLK}$) to deliver a core frequency ($F_K$) of 3.2 GHz (gigahertz) to each of the plurality of cores, for instance, by using a frequency divider ratio of 32. In an embodiment, a specification core frequency ($F_{SPEC}$) is preset or pre-specified for each of the cores 110, 120, 130 and 140 in the multi-core processor, such that, an operational core frequency ($F_K$) at which a core K of the cores 110, 120, 130 and 140 performs or operates has to exceed the preset specification core frequency in order for the multi-core processor to pass testing. Further, in an embodiment, the operational or operating core frequency ($F_K$) of a core among the plurality of cores in the multi-core processor is proportional to the respective supply voltage provided or supplied by the respective power supply voltage. Furthermore, a maximum operational or operating core frequency of a core ($F_{MAX}$) is defined as the core frequency or rate at which the core functions correctly with a given power supply voltage ($V_{DDK}$) supplied to the core. In an embodiment, the supply voltage supplied or provided to a core by a power supply voltage is adjustable by the controller 150. For instance, the supply voltage ($V_{DD1}$) supplied by the power supply voltage 114 to the core 110 is adjustable by the controller 150. Similarly, the supply voltage ($V_{DD2}$) supplied by the power supply voltage 124 to the core 120, the supply voltage ($V_{DD3}$) supplied by the power supply voltage 134 to core 130 and the supply voltage ($V_{DD4}$) supplied by the power supply voltage 144 to core 140 are each adjustable by the controller 150, as discussed herein further with respect to FIG. 2. Moreover, increasing a supply voltage supplied to a core increases the operating or operational core frequency, $F_K$, since $F_K$ for a core K is given by: $F_K=\beta V_{DDK}$, such that performance is optimized in the core, which is discussed further herein below. In an embodiment, the apparatus further comprises a voltage level-translating communication transceiver 180 that is configured to enable communications between the main controller 150 and the plurality of cores 110, 120, 130 and 140. In an embodiment, the voltage level-translating communication transceiver 180 communicates the voltage $V_{DD1}$, $V_{DD2}$, $V_{DD3}$ and $V_{DD4}$ supplied to each of the respective cores 110, 120, 130 and 140, such that, the controller 150 may adjust the individual voltage supplied to a particular core, if necessary. Further, the voltage level-translating communication transceiver 180 is configured to enable communications between each of the plurality of cores 110, 120, 130 and 140.

Referring to FIG. 2, reference numeral 200 shows another embodiment of an apparatus for optimizing performance and power consumption in a multi-core processor. As shown in FIG. 2, each of the cores 210, 220, 230 and 240 in a multi-core processor is coupled to a main controller 250. Further, as shown in FIG. 2, core 210 is connected via wiring 212 to its own separate power supply voltage ($V_{DDR}$), reference numeral 214, whereas, core 220 is connected via wiring 222 to its own separate power supply voltage ($V_{DD2}$), reference numeral 224. In a similar manner, core 230 is connected via wiring 232 to its own separate power supply voltage ($V_{DD3}$), reference numeral 234 and core 240 is connected via wiring 242 to its own separate power supply voltage ($V_{DD4}$), reference numeral 244. In an embodiment, each of the respective wiring 212, 222, 232 and 242 is comprised of inductors, capacitors and resistors. Further, in an embodiment, the multi-core processor is coupled to a main PLL (Phase-Locked Loop), reference numeral 260, which is configured to receive an input clock frequency from a clock source 270, such as, a crystal oscillator (as shown in FIG. 1). In an embodiment, the main PLL 260 comprises a voltage-controlled oscillator (VCO), one or more frequency dividers, a phase detector or phase-frequency detector and a low-pass filter configured in a feedback loop for multiplying the input clock frequency to provide an output clock frequency that is provided to the multi-core processor. Further, in an embodiment, the multi-core processor comprises additional PLLs, which receive an input from the main PLL 260. In an embodiment, at least one PLL is coupled to each core in the multi-core processor, with the PLL being configured to further multiply the output clock frequency received from the main PLL 260 in order to deliver a reference input clock frequency that is higher than the input clock frequency received from the main PLL 260. As shown in FIG. 2, each of PLL1 (reference numeral 216), PLL2 (reference numeral 226), PLL3 (reference numeral 236) and PLL4 (reference numeral 246) receives an input clock frequency from the main PLL 260 (indicated by respective arrows 262, 264, 266 and 268), which provides a first multiple of the clock frequency provided by the clock source 270. Further, each of the PLLs, PLL1 (reference numeral 216), PLL2 (reference numeral 226), PLL3 (reference numeral 236) and PLL4 (reference numeral 246), delivers a reference input clock frequency (indicated by arrows 218, 228, 238 and 248) that is a further multiple of the clock frequency provided (arrow 272) by the clock source 270. Accordingly, in an embodiment, a respective PLL is configured to provide a reference input clock frequency ($F_{CLK}$) to a respective core K to ensure that a respective operational or operating core frequency ($F_K$) of the respective core is at least equal to the adjusted reference input clock frequency. Further, as mentioned herein above with respect to FIG. 1, a specification core frequency ($F_{SPEC}$) is preset or pre-specified for each of the cores 210, 220, 230 and 240 in the multi-core processor, such that, an operational core frequency ($F_K$) at which a core K of the cores 210, 220, 230 and 240 performs or operates has to exceed the preset specification core frequency in order for the multi-core processor to pass testing. In an embodiment, the controller 250 is configured to collect core performance data and core power consumption data measured for the plurality of cores. Further, the main controller is configured to adjust either a respective supply voltage ($V_{DDK}$) provided by the respective power supply voltage connected to a respective core K or is configured to adjust the reference input clock frequency provided to the respective core, such that, adjustment of either the supply voltage provided or the respective input clock frequency provided to the respective core optimizes a respective core performance and a respective core power consumption by the respective core, and wherein the main controller dynamically adjusts the supply voltage provided by the power supply voltage to each of the plurality of cores in real-time mode. The apparatus 200 further comprises a voltage level-translating communication transceiver (shown in FIG. 1) that is configured to enable communications between the main controller 250 and the plurality of cores 210, 220, 230 and 240. In an embodiment, the voltage level-translating communication transceiver communicates the voltage $V_{DD1}$, $V_{DD2}$, $V_{DD3}$ and $V_{DD4}$ supplied to each of the respective cores 210, 220, 230 and 240, such that, the controller 250 may adjust the individual voltage supplied to a particular core, if necessary. Further, the voltage level-translating communication transceiver is configured to enable communications between each of the plurality of cores 210, 220, 230 and 240.

Moreover, given that the operational or operating core frequency ($F_K$) of a core K in the multi-core processor is proportional to the respective supply voltage provided or supplied by the respective power supply voltage ($V_{DDK}$), increasing the power supply voltage increases the operational or operating core frequency of the core. For instance, the supply voltage supplied by the power supply voltage 214 ($V_{DD1}$) to the core 210 is adjustable by the controller 250. Similarly, the supply voltage supplied by the power supply voltage 224 ($V_{DD2}$) to the core 220, the supply voltage supplied by the power supply voltage 234 ($V_{DD3}$) to core 230 and the power supply supplied by the power supply voltage 244 ($V_{DD4}$) to core 240 are each adjustable by the controller 250, as discussed herein further with respect to FIGS. 3A-3B, 4A-4B and 5A-5D. Moreover, increasing a supply voltage supplied to a core K increases performance by increasing the operating or operational core frequency, since $F_K$ for a core K is given by: $F_K = \beta V_{DD}$, where $V_{DD}$ is the supply voltage supplied to a core K and $F_K$ is the operational core frequency achievable by adjusting the supply voltage, which is further discussed herein below. Moreover, increasing the supply voltage ($V_{DDK}$) supplied to a core K increases power consumption ($P_K$) of the core K, which is given by the formula: $P_K = \alpha V_{DD}^2 F_{CLK}$, where $V_{DD}$ is the supply voltage supplied to a core K and $F_{CLK}$ is the clock frequency supplied to the core K. As such, the controller is configured to balance power consumption within the core while balancing the operational core frequency of a core based on goals or targets to be achieved for the multi-core processor.

Figure 3A:
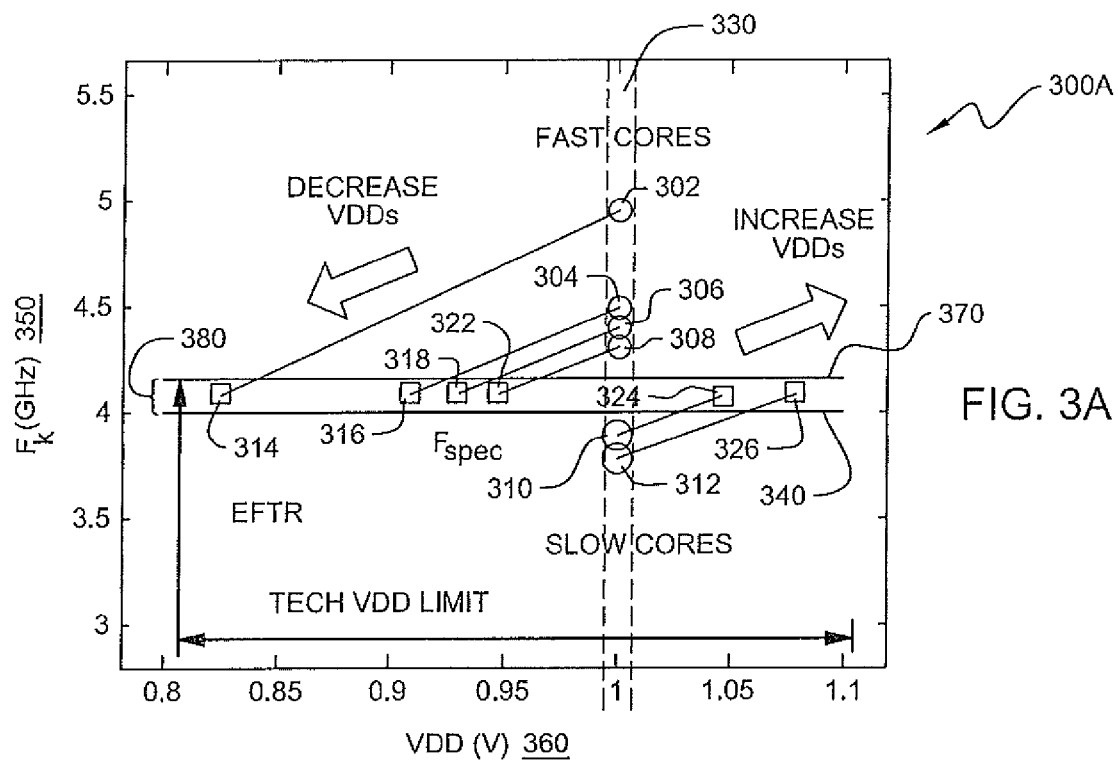
FIGS. 3A-3B are graphs illustrating an example of adjusting the supply voltage supplied to one or more cores to balance the operational core frequency of the cores in a multi-core processor, in accordance with an embodiment of the invention.
Figure 3B:
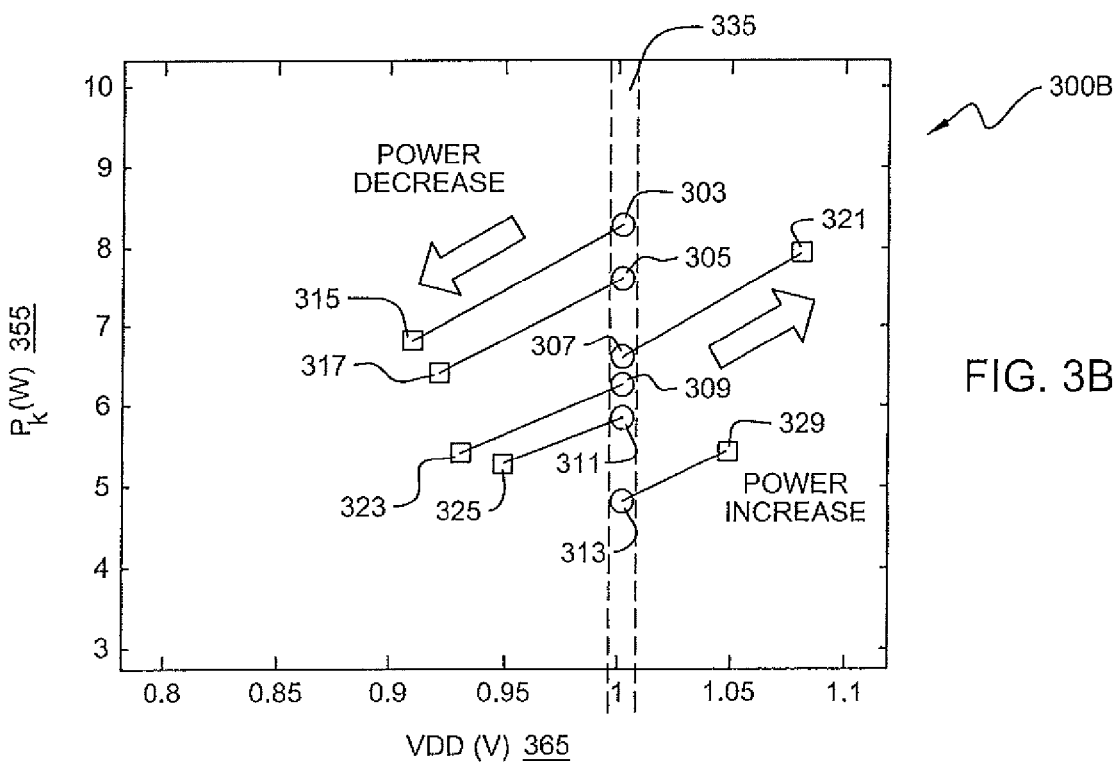

Reference is now made to FIGS. 3A-3B, 4A-4B and 5A-5D, which provide examples of the apparatus described herein above that can be utilized for adjusting either supply voltage or the clock frequency and/or power consumption of a respective core to optimize the operational core frequency of a core and/or optimize the power consumption of a core. Turning to FIGS. 3A and 3B, reference numeral 300A and 300B, illustrate an example of adjusting the supply voltage ($V_{DD}$) supplied to one or more cores in a multi-core processor, such that, the operational core frequency ($F_K$) of a core is within an Equi-Frequency Tuning Range 380 (EFTR), and the overall power consumption is minimized within the multi-core processor, as shown by reference numeral 300B of FIG. 3B. It is understood that although the examples in FIGS. 3A and 3B discuss the invention in terms of a multi-core processor having six cores, the multi-core processor may have more or less cores. As shown in the graph of FIG. 3A, the horizontal axis depicts the supply voltage 360 (VDD or $V_{DD}$) in volts (V), whereas, the vertical axis depicts an operational core frequency 350 ($F_K$) in gigahertz (GHz) achievable in a core in a multi-core processor by adjusting the supply voltage (VDD). In particular, if a uniform VDD, for instance, a supply voltage of 1.0 V (reference numeral 330) is supplied to each core 302, 304, 306, 308, 310 and 312 (depicted by round circles initially and then as squares when their voltage levels have been adjusted), it may turn out that cores 302, 304, 306 and 308 are operating at an operational core frequency that is faster than the required specification frequency ($F_{SPEC}$), whereas, cores 310 and 312 are operating at an operational core frequency that is slower than the required specification frequency ($F_{SPEC}$), represented by reference line 340, due to within die or chip variation. Instead of the entire multi-core processor or chip failing testing because of the two slower cores 310 and 312, which do not meet the required specification frequency ($F_{SPEC}$), the inventive apparatus (shown in FIGS. 1 and 2) provides individual supply voltages for each of the cores, such that, a respective voltage supplied to a core can be adjusted by a main controller or main control core, as discussed in FIGS. 1 and 2 herein above. As such, in FIG. 3A, the voltage supplied to cores 302, 304, 306 and 308 can be decreased, such that, each of the cores operational core frequency (as represented by line 370) is still above the required specification frequency ($F_{SPEC}$) 340. In particular, the supply voltage of core 302 is decreased from 1.0 V to around 0.81 V (the core now shown as square 314), whereas, the supply voltage of core 304 is decreased from 1.0 V to around 0.91 V (the core now shown as square 316). Similarly, the supply voltage of core 306 is decreased from 1.0 V to around 0.92 V (the core now shown as square 318) and the supply voltage of core 308 is decreased from 1.0 V to around 0.95V (the core now shown as square 322). On the other hand, the supply voltage for the two slower cores 310 and 312 is increased, such that the supply voltage of core 310 is increased from 1.0 V to around 1.04 V (the core now shown as square 324) and the supply voltage of core 312 is increased from 1.0 V to around 1.08 V (the core now shown as square 326). As such, the operational core frequency of the cores is optimized. Moreover, the adjusted voltage level of each core is still within a technical voltage limit of 0.8 V to 1.1 V, such that, operational functionality of the multi-core processor is not impacted by going beyond this voltage limit. Accordingly, the voltage supplied to the cores can be adjusted so that each core has a certain core frequency or speed that is within the Equi-Frequency Tuning Range (EFTR), reference numeral 380 in FIG. 3A, for obtaining a maximum operating core frequency ($F_K$), reference line 370, that is above the minimum specification core frequency requirement ($F_{SPEC}$) 340 for the cores in the multi-core processor, while minimizing overall power consumption ($P_K$) in the multi-core processor, as discussed below.

Turning to FIG. 3B, reference numeral 300B, illustrates changes in power consumption when the supply voltage ($V_{DD}$ or VDD) of each of the cores is adjusted, as discussed herein above with respect to FIG. 3A. As mentioned herein above, the operating or operational core frequency, $F_K$ for a core K is given by: $F_K = \beta V_{DD}$, where $V_{DD}$ is the supply voltage supplied to a core K, thus, the maximum operational core frequency $F_K$ achievable being proportional to the supply voltage $V_{DD}$ and where adjusting the supply voltage supplied to a core adjusts the maximum operational core frequency of the core. Moreover, given that the power consumption ($P_K$) of the core K is given by the formula: $P_K = \alpha V_{DD}^2 F_{CLK}$, where $V_{DD}$ is the supply voltage supplied to a core K and $F_{CLK}$ is the clock frequency supplied to the core K, such that, increasing the supply voltage increases the power consumption given that power consumption of a core is proportional to the supply voltage squared. As shown in the graph of FIG. 3B, the horizontal axis depicts the supply voltage 365 ($V_{DD}$) in volts (V), whereas, the vertical axis depicts a core's power consumption 355 ($P_K$) in watts (W). In particular, if a uniform VDD, for instance, a supply voltage of 1.0 V (now reference numeral 335) is supplied to each core 303, 305, 307, 309, 311 and 313 (depicted by round circles initially and then as squares when their voltage levels are changed, which leads to power adjustment), it may turn out that some of the cores (cores 307 and 313 in FIG. 3B) are operating at an operational core frequency that is slower than the required specification frequency ($F_{SPEC}$), whereas, the rest of the cores 303, 305, 309, 311 are operating at an operational core frequency that is faster than the required specification frequency ($F_{SPEC}$), discussed in FIG. 3A. As such, when the supply voltage to the faster cores 303, 305, 309, 311 is decreased (shown by squares 315, 317, 323 and 325, respectively), the power consumption is also decreased in these four cores. On the other hand, when the supply voltage to the slower cores 307 and 313 is increased (shown by squares 321 and 329, respectively), the power consumption is also increased in these two cores. However, since the power consumption of four of the six cores has been decreased, overall performance of the multi-core processor is achieved. Accordingly, the controller can measure a core's operational core frequency and can determine whether or not the supply voltage to a respective core needs to be adjusted in order to improve the core frequency or speed of one or more cores in the multi-core processor and, hence, improve the overall power consumption and performance of the multi-core processor.

Figure 4A:
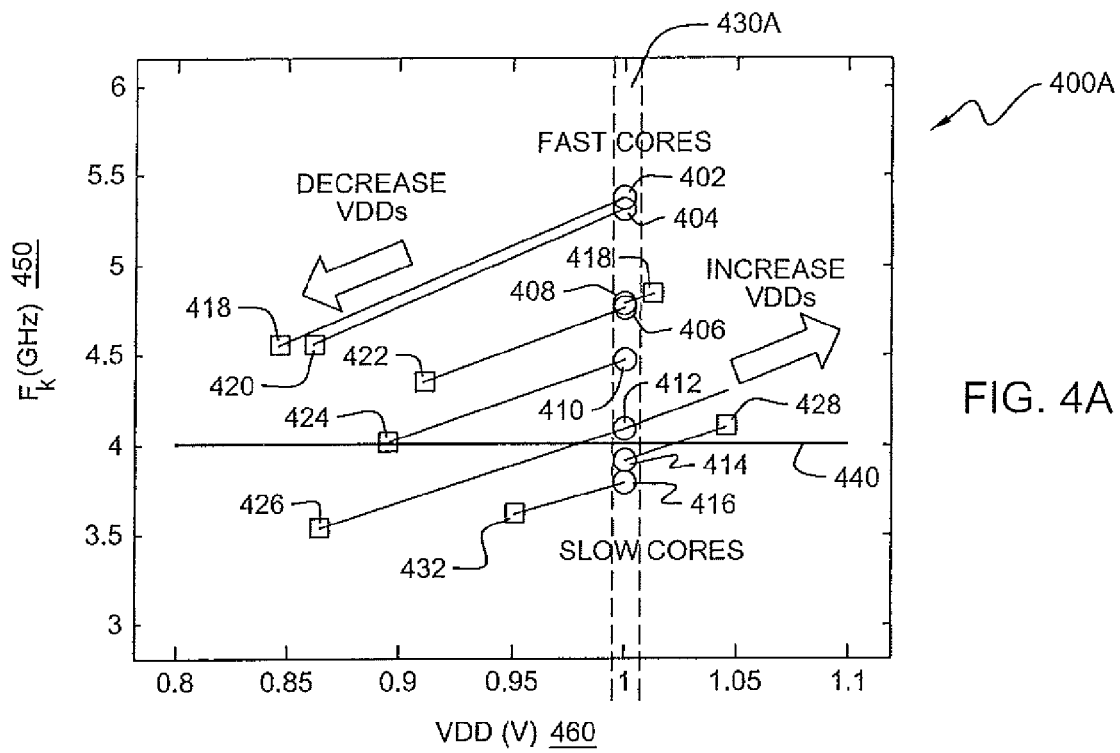
FIGS. 4A-4B are graphs illustrating an example of adjusting the supply voltage supplied to one or more cores to balance the power consumption in the one or more cores in the multi-core processor, in accordance with an embodiment of the invention.
Figure 4B:
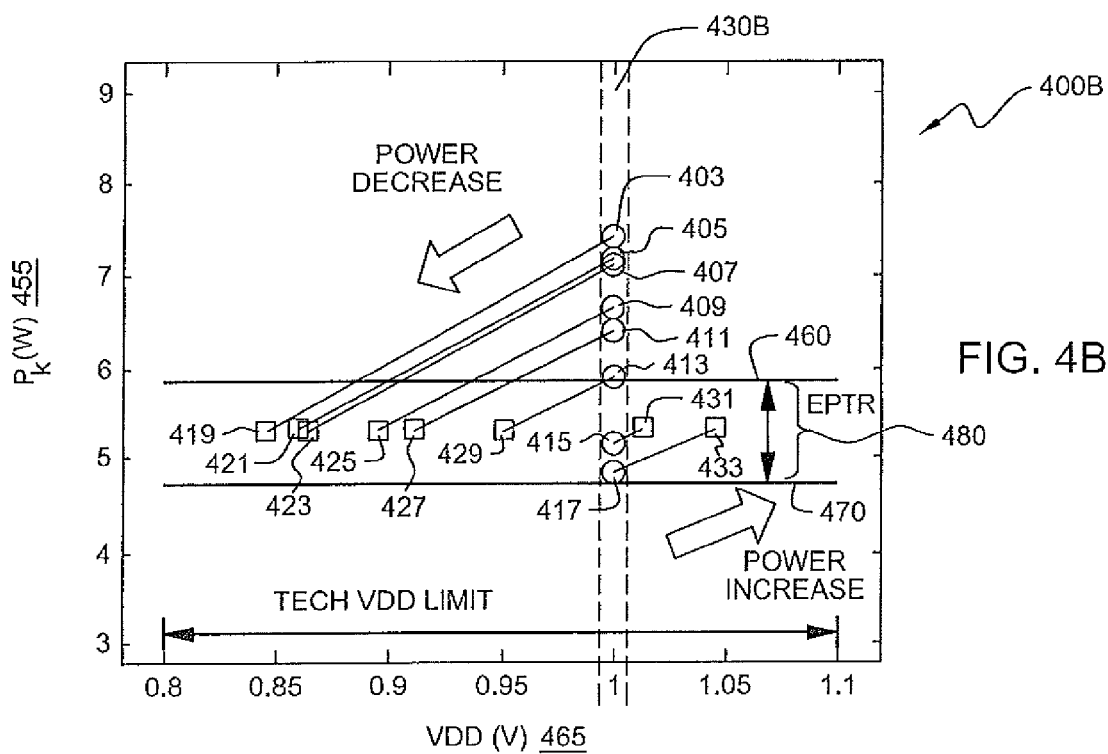

Turning to FIGS. 4A and 4B, reference numeral 400A and 400B, illustrate an example of adjusting the supply voltage ($V_{DD}$) supplied to one or more cores in a multi-core processor (shown by reference numeral 400A of FIG. 4A), such that, the power consumption is maintained within an Equi-Power Tuning Range 480 (EPTR), shown by reference numeral 400B of FIG. 4B, for minimizing overall power consumption. In an embodiment, the EPTR 480 (in FIG. 4B) represents a power consumption range that is greater than the minimum power consumption specification requirement, indicated by reference line 470 and less than a maximum power consumption level, indicated by reference line 460, that could lead to an increase in temperature and, which could lead to eventual malfunctioning of a core in the multi-core processor. It is understood that although the examples in FIGS. 4A and 4B discuss the invention in terms of a multi-core processor having eight cores, the multi-core processor may have more or less cores. As shown in the graph of FIG. 4A, the horizontal axis depicts the supply voltage, reference numeral 460 ($V_{DD}$) in volts (V), whereas, the vertical axis depicts an operational core frequency, reference numeral 450 ($F_K$) in gigahertz (GHz) achievable in a core in a multi-core processor by adjusting the supply voltage ($V_{DD}$). In particular, if a uniform VDD, for instance, a supply voltage of 1.0 V (reference numeral 430A) is supplied to each core 402, 404, 406, 408, 410, 412, 414 and 416 (depicted by round circles initially and then as squares when their voltage levels have been adjusted), it may turn out that cores 402, 404, 408, 410, 412 and 416 are operating at an operational core frequency that is faster than the required specification frequency ($F_{SPEC}$), reference numeral 440, whereas, cores 406 and 416 are operating at an operational core frequency that is slower than the required specification frequency ($F_{SPEC}$), represented by reference line 440. Again, instead of discarding the entire chip or multi-core processor because of the two slower cores 406 and 416, the inventive apparatus (shown in FIGS. 1 and 2) provides individual supply voltages for each of the cores, such that, a respective voltage supplied to a core can be adjusted by a main controller or main control core, as discussed in FIGS. 1 and 2 herein above. As such, in FIG. 4A, the voltage supplied to cores 402, 404, 406, 408, 410, 412, 414 and 416 can be increased or decreased, such that, the operational core frequency of the cores is still above the required specification frequency ($F_{SPEC}$) 440 shown in FIG. 4A, while the power consumption of each of the cores falls within the Equi-Power Tuning Range (EPTR), reference numeral 480, shown in FIG. 4B. As mentioned herein above, the operating or operational core frequency, $F_K$ for a core K is given by: $F_K = \beta V_{DD}$, where $V_{DD}$ is the supply voltage supplied to a core K, thus, the operational core frequency $F_K$ achievable is proportional to the supply voltage $V_{DD}$ and by adjusting the supply voltage supplied to a core the operational core frequency of the core is adjusted. In particular, as shown in FIG. 4A, the supply voltage of cores 402, 404, 408, 410, 412 and 416 is decreased (now shown as squares 418, 420, 422, 424, 426 and 432, respectively), whereas, the supply voltage of core 406 and 414 is increased (now shown as squares 418 and 428, respectively). Turning to FIG. 4B, reference numeral 400B, illustrates how the power consumption can be adjusted when the supply voltage ($V_{DD}$) is adjusted, given the formula $P_K = \alpha V_{DD}^2 F_{CLK}$, where $V_{DD}$ is the supply voltage supplied to a core K and $F_{CLK}$ is the clock frequency supplied to the core K, such that, increasing the supply voltage increases the power consumption since power consumption of a core is proportional to the supply voltage squared and is proportional to the clock frequency supplied to the cores, as discussed herein above with respect to FIGS. 1 and 2. As shown in FIG. 4B, the horizontal axis depicts the supply voltage ($V_{DD}$) in volts (V), reference numeral 465, whereas, the vertical axis depicts a core's power consumption ($P_K$) in watts (W), reference numeral 455. In particular, if a uniform VDD, for instance, a supply voltage of 1.0 V (now reference numeral 430B) is supplied to each core 403, 405, 407, 409, 411, 413, 415 and 417 (depicted by round circles initially and then as squares when their voltage levels and, thus, power have been adjusted), it may turn out that some of the cores (cores 403, 405, 407, 409, 411 and 413 in FIG. 4B) are operating at a power consumption that is higher than within the Equi-Power Tuning Range (EPTR) 480 that is desired. As such, the supply voltage supplied to each of the cores 403, 405, 407, 409, 411 and 413 is decreased (now represented by squares 419, 421, 423, 427 and 429, respectively), whereas, the supply voltage supplied to each of the cores 415 and 417 is increased (now represented by squares 431 and 433, respectively), so that the power consumption of each of the cores in the multi-core processor is brought within the Equi-Power Tuning Range 480. Accordingly, the controller can balance the power consumption of cores in a multi-core processor in order to improve power consumption of the core.

Figure 5A:
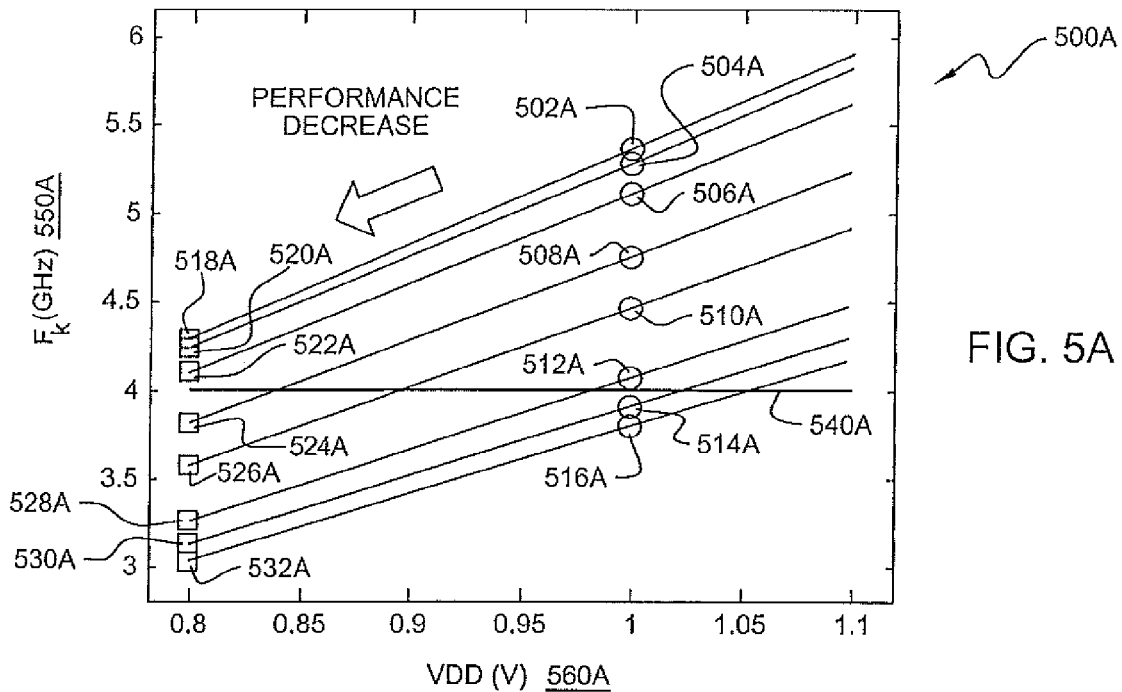
FIGS. 5A-5C are graphs illustrating an example of adjusting the supply voltage to provide minimum operational power or performance in a multi-core processor, in accordance with an embodiment of the invention.
Figure 5B:
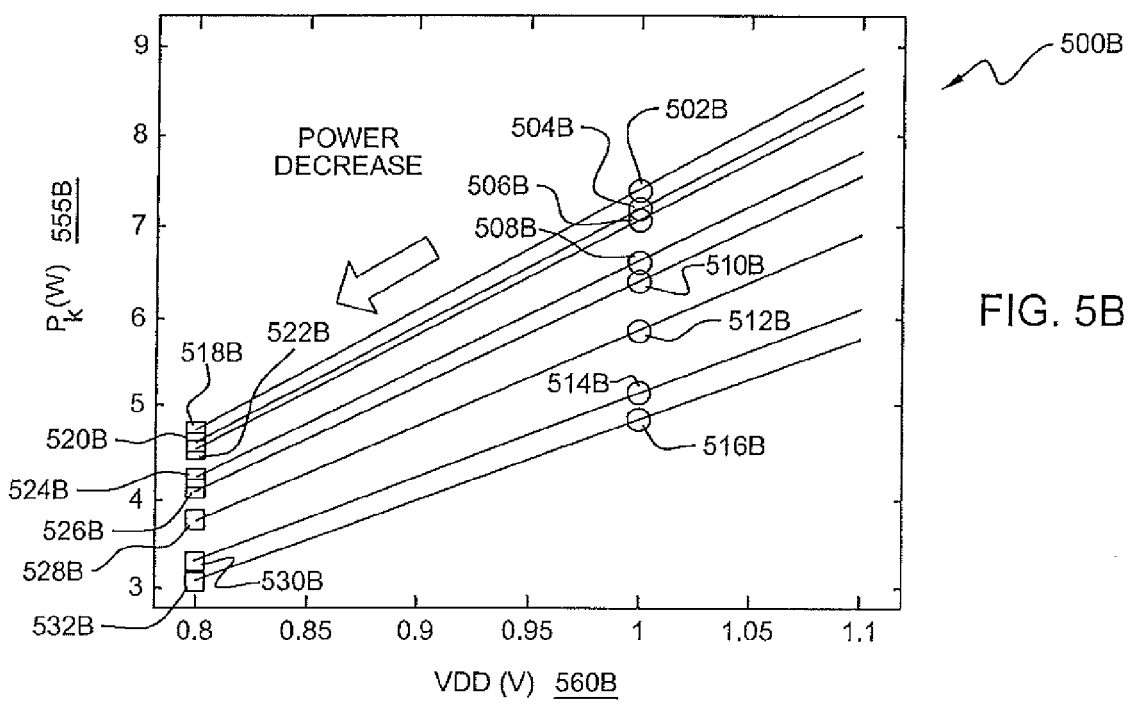
Figure 5C:
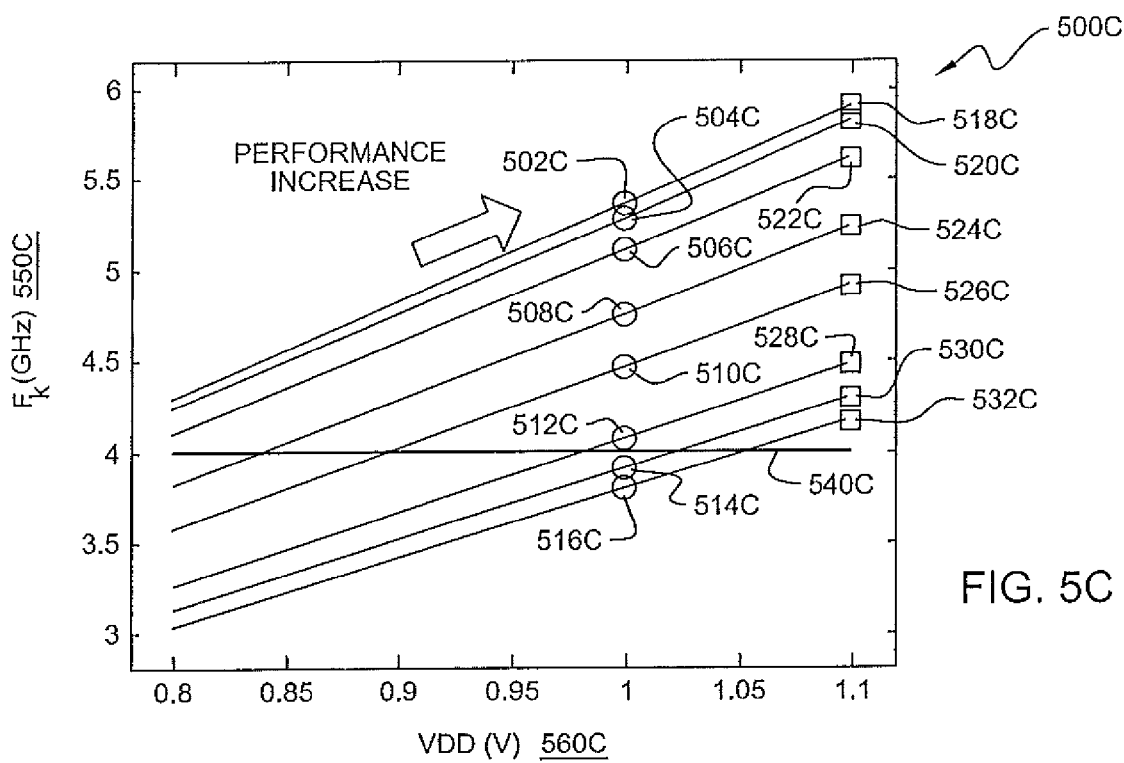
Figure 5D:
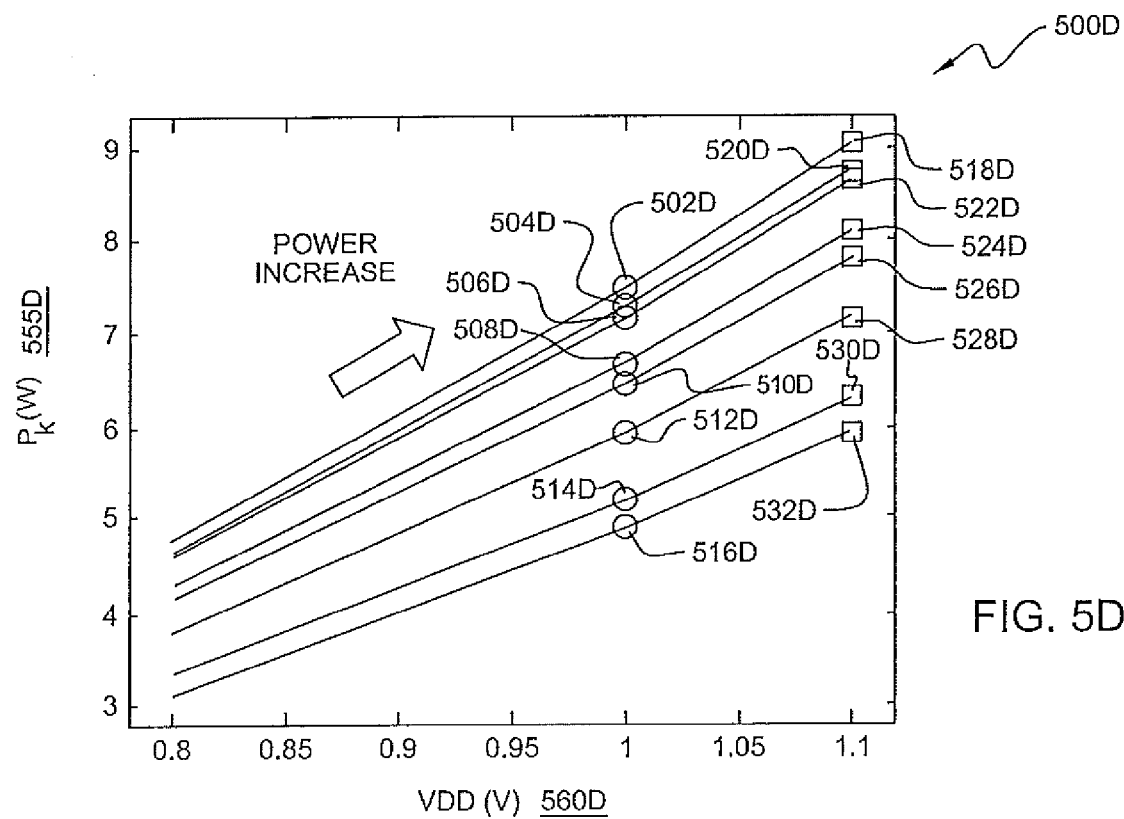

Reference is now made to FIGS. 5A-5D, where FIGS. 5A and 5B illustrate adjusting the supply voltage to achieve minimum operational power in a multi-core processor, and where FIGS. 5C and 5D illustrate adjusting the supply voltage to achieve maximum performance of a multi-core processor. It is understood that although the examples in FIGS. 5A through 5D discuss the invention in terms of a multi-core processor having eight cores, the multi-core processor may have more or less cores. Turning to FIG. 5A, reference numeral 500A illustrates an example of how adjusting, namely, decreasing the supply voltage ($V_{DD}$), reference numeral 560A supplied to each of eight cores in a multi-core processor, reference numerals 502A, 504A, 506A, 508A, 510A, 512A, 514A, 516A to a minimum supply voltage, reference numerals 518A, 520A, 522A, 524A, 526A, 528A, 530A and 532A, respectively, decreases the operational core frequency 550A of some of the eight cores below a maximum operational core frequency 540A, but still above a minimum or specification core frequency and hence minimizes the optimum performance of the multi-core processor. In particular, a controller in a multi-core processor can be configured to decrease a uniform $V_{DD}$ supplied to each of the eight cores, for instance, from a supply voltage of 1.0 V to a supply voltage of 0.8V. Moreover, as shown in FIG. 5B, reference numeral 500B, decreasing the supply voltage ($V_{DD}$), reference numeral 560B supplied to each of the eight cores in a multi-core processor, reference numerals 502B, 504B, 506B, 508B, 510B, 512B, 514B, 516B, respectively, decreases the power consumption ($P_K$), reference numeral 555B of these eight cores in the multi-core processor. In particular, decreasing the supply voltage ($V_{DD}$) supplied to each of the eight cores, reference numerals 502B, 504B, 506B, 508B, 510B, 512B, 514B, 516B to a minimum supply voltage, reference numerals 518B, 520B, 522B, 524B, 526B, 528B, 530B and 532B, respectively, decreases the power consumption in each of these eight cores as well. Accordingly, a controller in a multi-core processor can be configured to decrease a uniform $V_{DD}$ supplied to each of the eight cores, for instance, from a supply voltage of 1.0 V to a supply voltage of 0.8V in order to achieve minimal operational power or minimum performance, as shown in FIGS. 5A and 5B.

Turning to FIG. 5C, reference numeral 500C illustrates an example of how adjusting, namely, increasing the supply voltage ($V_{DD}$), reference numeral 560C supplied to each of eight cores in a multi-core processor, reference numerals 502C, 504C, 506C, 508C, 510C, 512C, 514C, 516C to a maximum supply voltage, reference numerals 518C, 520C, 522C, 524C, 526C, 528C, 530C and 532C, respectively, increases the operational core frequency 550C of these eight cores above a maximum operational core frequency 540C, and hence increases the performance of the multi-core processor. In particular, a controller in a multi-core processor can be configured to increase a uniform $V_{DD}$ supplied to each of the eight cores, for instance, from a supply voltage of 0.8V to a supply voltage of 1.0V. Accordingly, increasing the supply voltage ($V_{DD}$), increases the operating core frequency ($F_K$), which in turns improves or maximizes the overall performance of the microprocessor. Moreover, as shown in FIG. 5D, reference numeral 500D, increasing the supply voltage ($V_{DD}$), reference numeral 560D supplied to each of eight cores in a multi-core processor, reference numerals 502D, 504D, 506D, 508D, 510D, 512D, 514D, 516D, respectively, also increases the power consumption ($P_K$), reference numeral 555D of these eight cores in the multi-core processor. In particular, increasing the supply voltage ($V_{DD}$) supplied to each of the eight cores, reference numerals 502D, 504D, 506D, 508D, 510D, 512D, 514D, 516D to 518D, 520D, 522D, 524D, 526D, 528D, 530D and 532D, respectively, increases the power consumption in each of these eight cores as well. Accordingly, a controller in a multi-core processor can be configured to increase a uniform $V_{DD}$ supplied to each of the eight cores, for instance, from a supply voltage of 0.8V to a supply voltage of 1.0 V in order to achieve maximum performance or operational power, as shown in FIGS. 5C and 5D.

In another embodiment, the invention provides a method for optimizing performance and power consumption of a multi-core processor. The method comprises providing a multi-core processor having a plurality of cores, the multi-core processor being coupled to a clock source configured to provide a reference input clock frequency to the plurality of cores in the multi-core processor, connecting a separate voltage power source configured to provide a respective supply voltage to each core of the plurality of cores in the multi-core processor, wherein a respective core operational clock frequency is proportional to the respective supply voltage provided to a respective core, and wherein a respective core power consumption by the respective core is proportional to the reference input clock frequency and to the respective supply voltage squared, collecting, using a main controller coupled to each core of the plurality of cores, core performance data and core power consumption data measured for each core of the plurality of cores and adjusting, using the main controller, either the respective supply voltage provided to the respective core of the plurality of cores or the reference input clock frequency provided to the respective core of the plurality of cores, based on a respective core performance data and a respective core power consumption data collected for the respective core of the plurality of cores, wherein adjustment of either the respective power provided to the respective core ensures that the respective operational core frequency of the respective core is greater than a respective specification core frequency preset for the respective core, and wherein adjustment of the reference input clock frequency ensures that the respective operational core frequency of the respective core is at least equal to the reference input clock frequency, whereby the respective core performance and the respective core power consumption by the respective core is optimized. The method further comprises enabling, utilizing a voltage level-translating communication transceiver, communications between the main controller and the plurality of cores and enabling communications between each of the plurality of cores. In an embodiment, the adjusting step further comprises supplying each core of the plurality of cores with at least one PLL (Phase Locked Loop) having one or more voltage-controlled oscillators (VCOs) and one or more dividers, at least one PLL with the one or more VCOs and the one or more dividers being configured to dynamically adjust the input clock frequency provided to the respective core, wherein the respective operational core frequency is at least equal to the reference input clock frequency, and wherein the respective power consumption by the respective core is adjusted. In an embodiment, the adjusting step further comprises dynamically adjusting either the output power supply voltage or the input clock frequency provided to the respective core in real-time mode. In an embodiment, the adjusting step further comprises distributing, using the main controller, instruction blocks to each core of the plurality of cores in a manner that achieves a balancing criterion with respect to the plurality of cores, wherein the balancing criterion comprises at least one of: equal performance balancing, maximum performance balancing, power consumption balancing and instruction count balancing. In an embodiment, a core performance data measured for the multi-core processor comprises computing a sum of the respective core performance data measured for each core of the plurality of cores in the multi-core processor, and wherein the core power consumption data measured for the multi-core processor comprises computing a sum of a respective core power consumption data measured for each core of the plurality of cores.

Figure 6:
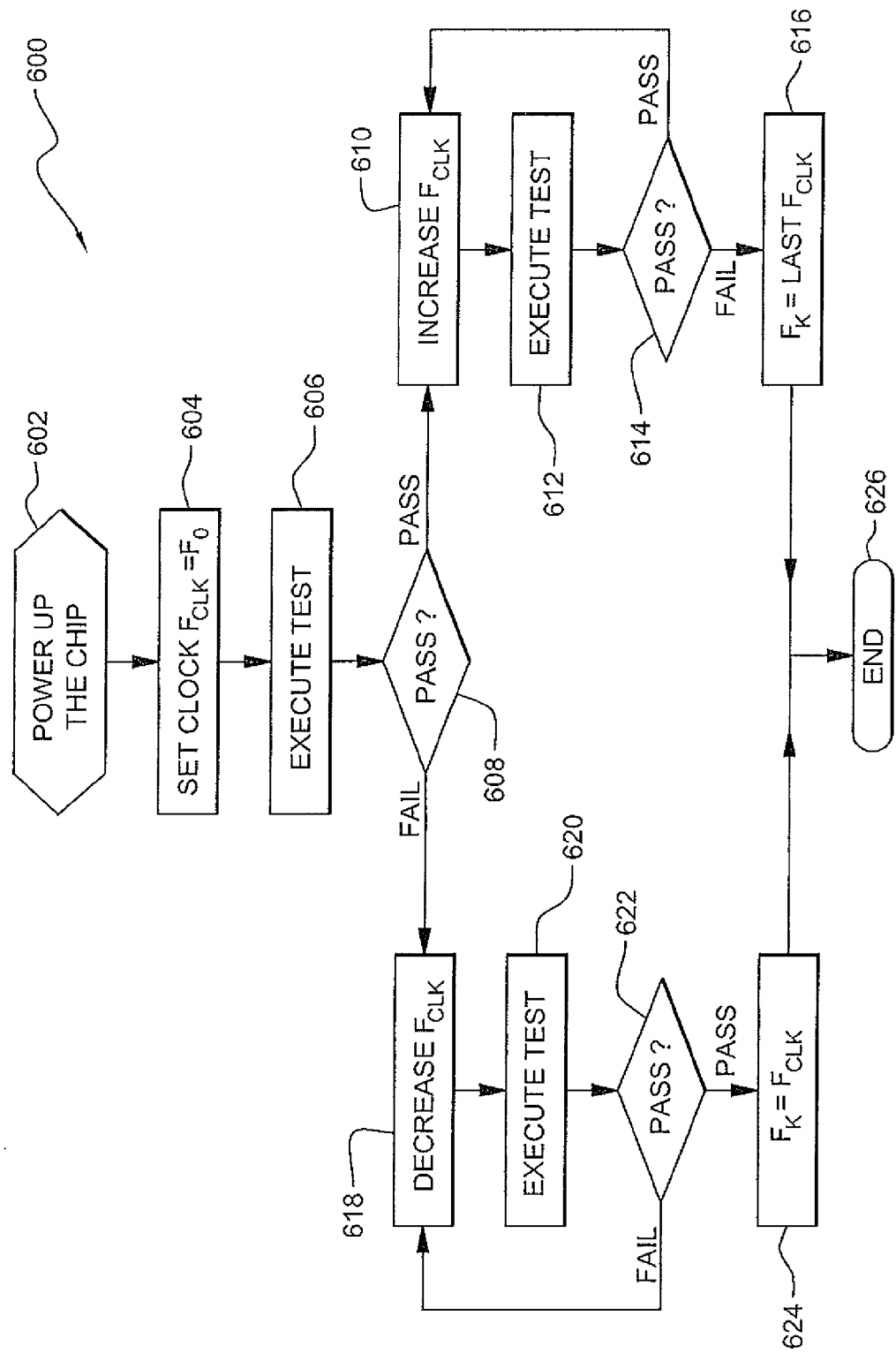
FIG. 6 is a flowchart illustrating a clock adjustment scheme for testing the cores in a multi-core processor, in accordance with an embodiment of the invention.

Turning to FIG. 6, reference numeral 600 depicts a flowchart outlining a method for determining a maximum operational core frequency ($F_K$) for a core in a multi-core processor by adjusting the clock frequency provided to the multi-core processor, such that, a maximum operational core frequency is achieved at a given supply voltage $V_{DD}$. In an embodiment, the controller is configured to determine a maximum operational core frequency for a core, as described herein below. The method begins with step 602, where the chip or microprocessor is powered up. In step 604, the clock frequency ($F_{CLK}$) is initialized, where $F_{CLK}$ is set to $F_0$, an initial clock frequency. A test is executed in step 606 to determine in step 608 whether or not the chip or multi-core processor passes the test when set to the initial $F_{CLK}$. If the multi-core processor fails the test in step 608, then the clock frequency is decreased in step 618 and the test is re-executed in step 620. Again, a determination is made in step 622 as to whether or not the multi-core processor passes the test. If the multi-core processor fails the test in step 622, then the process returns to step 618, where the clock frequency is decreased and the test is re-executed in step 620. Steps 618 through 622 are repeated until the multi-core processor passes the test in step 622. If the multi-core processor passes the test in step 622, $F_K$ is set to $F_{CLK}$ in step 624, ending the process at step 626. On the other hand, in step 608, if the multi-core processor passes the test in step 608, then the clock frequency is increased in step 610 and the test is re-executed in step 612. Again, a determination is made in step 614 as to whether or not the multi-core processor passes the test. If the multi-core processor passes the test in step 614, then the process returns to step 610, where the clock frequency is increased and the test is re-executed in step 612. Steps 610 through 614 are repeated until the multi-core processor fails the test in step 614. If the multi-core processor fails the test in step 614, $F_K$ is set in step 616 to the last $F_{CLK}$ that passed the test in step 614, ending the process at step 626. In another embodiment, a program or code running on an operating system may be run on an external system for adjusting either the clock frequency or the supply voltage supplied to the multi-core processor, as described further herein below with respect to FIG. 9.

Figure 7:
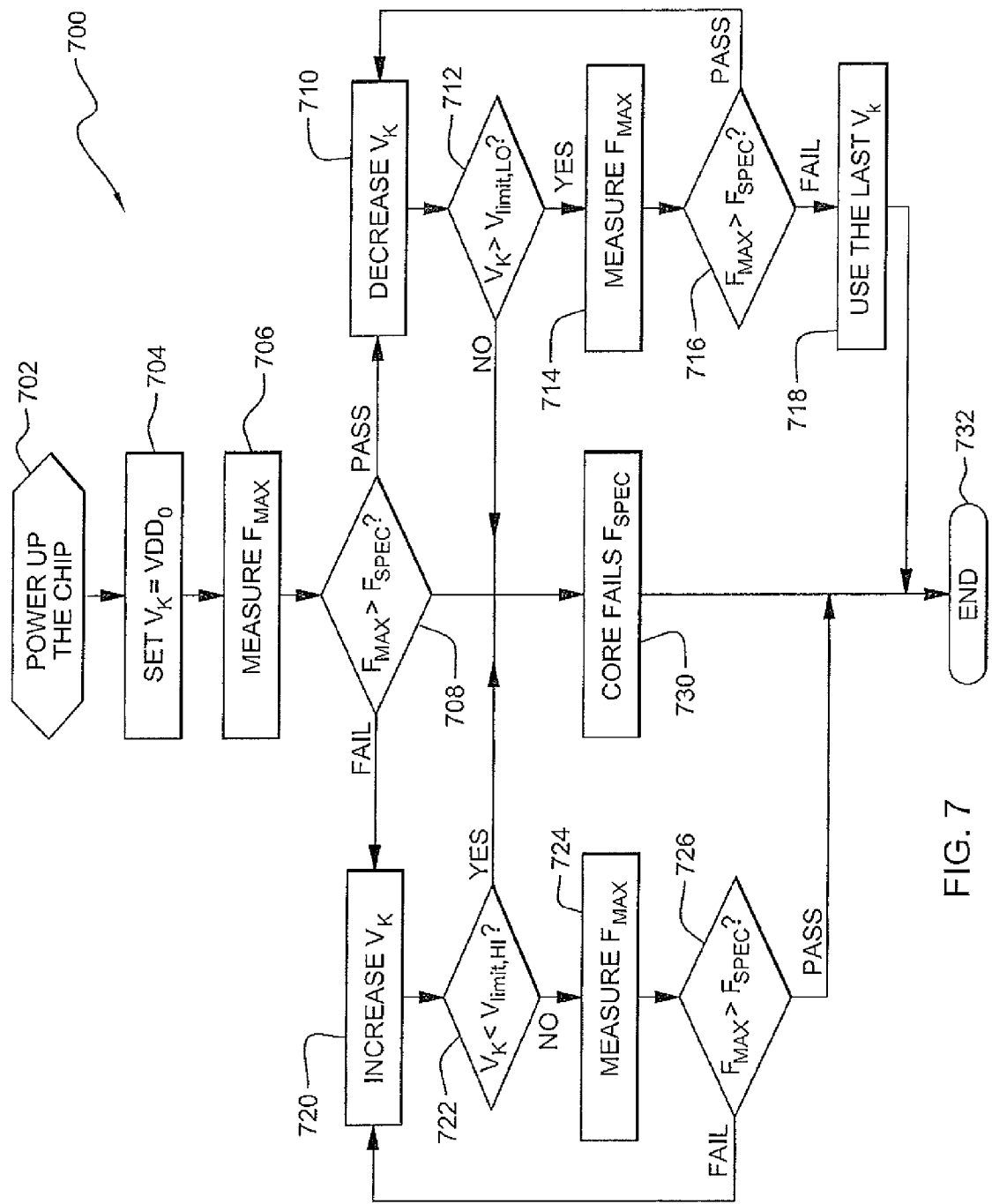
FIG. 7 is a flowchart illustrating a clock frequency adjustment scheme for optimizing the operational core frequency of a core in a multi-core processor, in accordance with an embodiment of the invention.

Turning to FIG. 7, reference numeral 700 depicts a flowchart outlining a method for determining whether an operational core frequency ($F_K$) for a core is greater than a specification core frequency ($F_{SPEC}$) preset for a core in a multi-core processor, such that, the supply voltage $V_K$ to a core can be adjusted to ensure that the core passes the minimum specification core frequency required. The method begins with step 702, where the chip or microprocessor is powered up. In step 704, the supply voltage to a core ($V_K$) is initialized to the initial supply voltage, $V_{DD0}$. Further, in step 706, the $F_K$ of a core is measured and a determination is made in step 708 as to whether or not the operational core frequency $F_K$ ($F_{MAX}$) is greater than $F_{SPEC}$. If the operational core frequency $F_{MAX}$ is greater than the preset specification core frequency $F_{SPEC}$, then the supply voltage $V_K$ to the core is decreased in step 710. A determination is made in step 712, as to whether or not the supply voltage $V_K$ is greater than a predetermined lower bound voltage $V_{LIMIT, LO}$. If the supply voltage $V_K$ is greater than a predetermined lower bound voltage $V_{LIMIT, LO}$, then the operational core frequency is measured in step 714 to determine in step 716 whether or not the operational core frequency is greater than the specification core frequency. If the operational core frequency is greater than the specification core frequency in step 716 (that is, fails) then the last successful supply voltage $V_K$ is used in step 718, ending the process at step 732. However, if the operational core frequency is greater than the specification core frequency in step 716, then the process returns back to step 710 and steps 710 through 716 are repeated, as necessary. Going back to step 708, if the operational core frequency $F_{MAX}$ is not greater than the preset specification core frequency $F_{SPEC}$ (fails), then the supply voltage $V_K$ to the core is increased in step 720. A determination is made in step 722, as to whether or not the supply voltage $V_K$ is less than a predetermined upper bound voltage $V_{LIMIT, HI}$. If the supply voltage $V_K$ is less than the predetermined upper bound voltage $V_{LIMIT, HI}$, then the core fails the minimum $F_{SPEC}$ requirement in step 730, ending the process at step 732. However, if the supply voltage $V_K$ is not less than a predetermined voltage limit $V_{TH}$, then the operational core frequency is measured in step 724 to determine in step 726 whether or not the operational core frequency is greater than the specification core frequency. If the operational core frequency is not greater than the specification core frequency in step 726 (that is, fails) then the supply voltage $V_K$ is increased in step 720 and the steps 720 through 726 are repeated, as necessary until $F_{MAX}$ is greater than $F_{SPEC}$. However, if the operational core frequency $F_{MAX}$ is greater than the specification core frequency $F_{SPEC}$ in step 726 (that is, passes), then the process ends at step 732.

Figure 8:
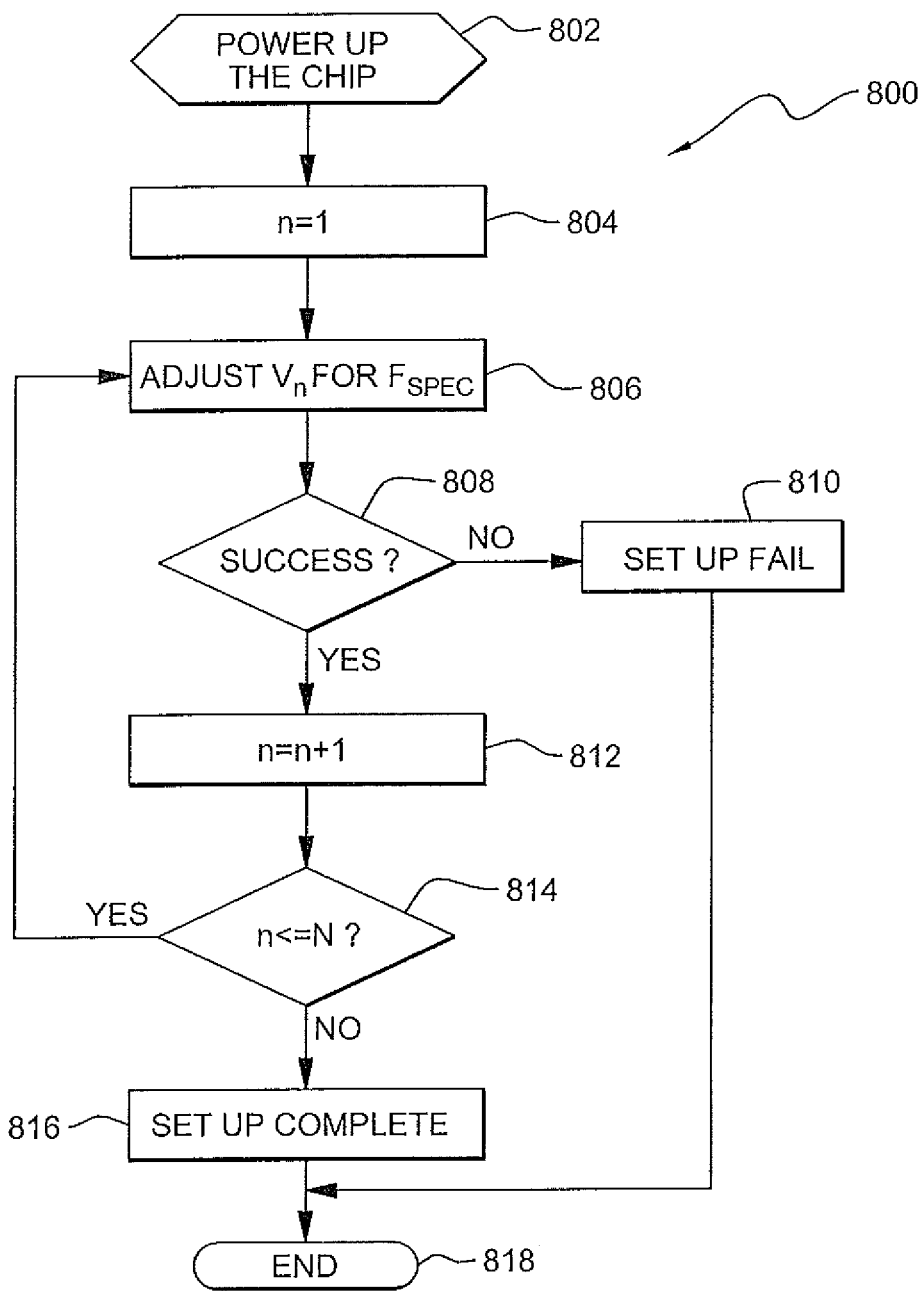
FIG. 8 is a flowchart illustrating a voltage adjustment scheme for maximizing an operational core frequency of a core in a multi-core processor in order to ensure that the core passes the required specification core frequency, in accordance with an embodiment of the invention.

Turning to FIG. 8, reference numeral 800 depicts a flowchart outlining a method for adjusting the supply voltage in order to ensure that a core meets the minimum specification core frequency ($F_{SPEC}$). The method begins with step 802, where the chip or microprocessor is powered up. In step 804, n=1 (current or first core), and in step 806, the supply voltage $V_n$ for the first core is adjusted in step 806 for the preset specification core frequency. A determination is made in step 808 as to whether or not the core passes the preset specification core frequency at the adjusted supply voltage for that core ($V_n$). If the core does not pass in step 808, the set up is deemed a failure in step 810, ending the process at step 818. However, if the core passes in step 808, then n is set to n=n+1 in step 812 and the next core in the multi-core processor is examined. Further, a determination is made in step 814 as to whether or not n<=N, where n is the current core and N is the total number of cores in the multi-core processor. If it is determined in step 814 that n>N (that is, n is not less than or equal to N), then the set up is complete in step 816 and the process ends in step 818. However, if in step 814, it is determined that n<=N, then the process continues with step 806 where the supply voltage for the current core is adjusted and the steps 806 through 814 in the process are repeated until each core is examined and there are no more cores whose supply voltage needs to be adjusted, thus, completing the set up in step 816 and ending the process in step 818.

In yet another embodiment, the invention provides a computer program product for optimizing performance and power consumption of a multi-core processor. The computer program product comprises a computer readable or computer-usable medium, first program instructions to supply a reference input clock frequency to a plurality of cores of a multi-core processor, the plurality of cores in the multi-core processor being coupled to a main controller, the first program instructions including instructions to supply a respective supply voltage to a respective core of the plurality of cores in the multi-core processor, wherein a respective core operational clock frequency is proportional to the respective supply voltage supplied to the respective core, and wherein a respective core power consumption by the respective core is proportional to the reference input clock frequency and to the respective supply voltage squared, second program instructions to collect, using the main controller, core performance data and core power consumption data measured for the plurality of cores, third program instructions to adjust, using the main controller, either the respective supply voltage supplied to the respective core or the reference input clock frequency supplied to the respective core, based on a respective core performance data and a respective core power consumption data collected for the respective core of the plurality of cores, wherein adjustment of either the supply voltage provided to the respective core or the reference input clock frequency supplied optimizes the respective core performance and the respective core power consumption by the respective core, and wherein the first, second and third program instructions are recorded on the computer readable medium. The computer program product further comprises fourth program instructions to enable communications between the main controller and the plurality of cores and to enable communications between each of the plurality of cores, utilizing a voltage level-translating communication transceiver. In an embodiment, the first program instructions include instructions to couple each core of the plurality of cores with at least one phase locked loop (PLL) circuit having one or more voltage-controlled oscillators (VCOs) and one or more dividers, at least one PLL circuit with the one or more VCOs and the one or more dividers being configured to dynamically adjust the reference input clock frequency of the respective core, wherein a respective operational core frequency of the respective core is at least equal to the reference input clock frequency, and wherein the respective power consumption by the core is adjusted. In an embodiment, the second program instructions include instructions to distribute, using the main controller, instruction blocks to each core of the plurality of cores in a manner that achieves a balancing criterion with respect to the plurality of cores, the balancing criterion comprises at least one of: equal performance balancing, maximum performance balancing, power consumption balancing and instruction count balancing. In an embodiment, the third program instructions include instructions to dynamically adjust the supply voltage provided to the respective core to ensure that the respective operational core frequency of the respective core is greater than a respective specification core frequency preset for the respective core, wherein the respective core performance and the respective power consumption of the respective core is optimized. In an embodiment, the third program instructions include instructions to dynamically adjust either the supply voltage provided or the reference input clock frequency supplied to the respective core in real-time mode. In an embodiment, a core performance data measured for the multi-core processor comprises computing a sum of the respective core performance data measured for each core of the plurality of cores in the multi-core processor, and wherein a core power consumption data measured for the multi-core processor comprises computing a sum of a respective core power consumption data measured for each core of the plurality of cores. In an embodiment, each of the first, second, third and fourth program instructions are recorded on the computer readable medium.

Figure 9:
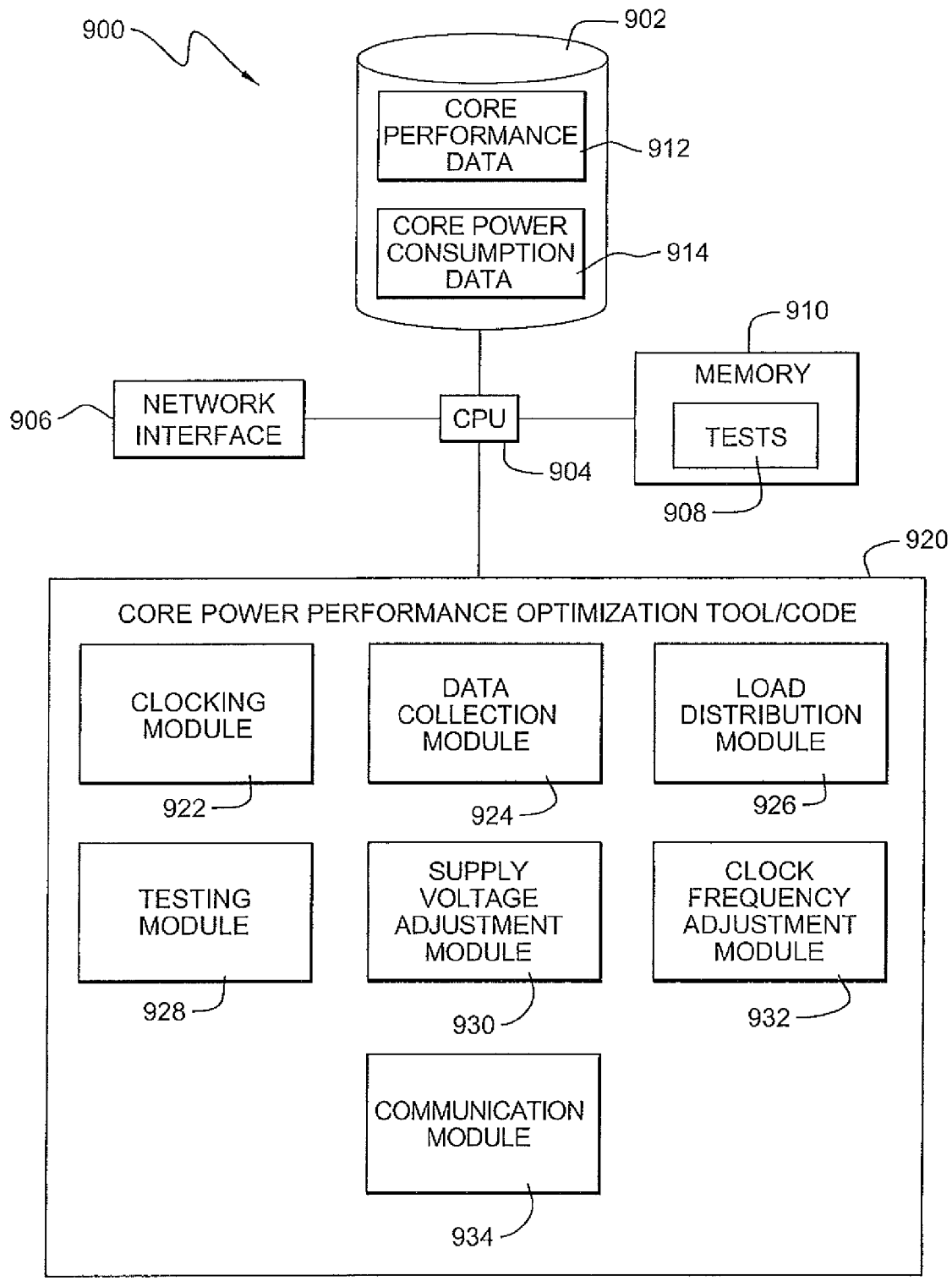
FIG. 9 is a schematic block system diagram illustrating an embodiment of a system having deployed thereon a core power and performance optimization tool or code for optimizing power and performance of multi-core processor, in accordance with an embodiment of the present invention.

Turning to FIG. 9, reference numeral 900 depicts a schematic block system diagram illustrating one embodiment of a computer system 900, such as, a standalone or personal computer or a server that has deployed thereon or is coupled to a system that has deployed thereon a core power and performance optimization tool 920 that is configured to manage the controller, as described herein above. The core power and performance optimization tool or code or program 920 can be loaded into the system 900 from a computer readable media, such as, a magnetic tape or disk, optical media, DVD, memory stick, semiconductor memory, etc. or downloaded from the Internet via a network adapter or card, such as, a TCP/IP adapter card. Although the invention is discussed herein below in terms of a server, it is understood that the invention can be practiced on a personal computer running a core power and performance optimization tool 920.

As shown in FIG. 9, the server or system 900 comprises a central processing unit (CPU) 904, a local storage device 902, a network interface 906 and a memory 910. The CPU 904 is configured generally to execute operations within the system/server 900, such as, the core power and performance optimization tool or code 920. The network interface 906 is configured, in one embodiment, to facilitate network communications of the system 900 over a communications channel of a network. In one embodiment, as shown in FIG. 9, the core power and performance optimization tool 920 which, in an embodiment, runs on a multi-core processor testing server or system 900, comprises a logic unit that contains a plurality of modules configured to functionally execute the necessary steps of adjusting either the supply voltage provided to a respective core or the respective input clock frequency provided to the respective core, such that, the adjustment optimizes a respective core performance and a respective core power consumption by the respective core. In particular, the core power and performance optimization tool or code 920 comprises a clocking module 922, a data collection module 924, a load or instruction distribution module 926, a testing module 928, a supply voltage adjustment module 930, a clock frequency adjustment module 932, and a communication module 934.

Referring to FIG. 9, the clocking module 922 of the core power and performance optimization tool 920 is configured to measure a reference input clock frequency supplied to one or more cores in a multi-core processor. The data collection module 924 is configured to collect core performance data and core power consumption data for the one or more cores in the multi-core processor. In an embodiment, the core performance data 912 collected is stored in storage 902, whereas, the core power consumption data 914 is stored in storage 902. Further, the load or instruction distribution module 926 is configured to distribute instruction blocks to the one or more cores in the multi-core processor based on analysis of the data collected by the data collection module 924. In an embodiment, the load or instruction distribution module 926 is configured to distribute instruction blocks to the plurality of cores in a manner that achieves a balancing criterion with respect to the plurality of cores, such as, achieving either equal performance balancing, maximum performance balancing, power consumption balancing or instruction count balancing. The testing module 928 is configured to run one or more tests 908 stored in memory 910 of the system 900 for testing the one or more cores in the multi-core processor, as discussed herein above with respect to FIGS. 6-8. The supply voltage adjustment module 930 is configured to adjust the supply voltage supplied to a core based on analysis of the data collected by the data collection module 924. Further the clock frequency adjustment module 932 is configured to adjust the clock frequency supplied to a core based on analysis of the data collected by the data collection module 924. The communications module 934 is configured to permit communication between the various modules of the power and optimization tool or code 920 and other systems, such as, the storage 902.

Accordingly, by providing an independent power supply for each core or at least to a group of cores, the controller can control each power supply to achieve specific core performances or power consumptions to provide a higher yield of multi-core processor chips that pass a specified or preset core frequency or specification speed test. Moreover, given that the core frequency is proportional to the power supply voltage, by increasing the supply voltage, the speed of the core and, hence, the multi-core processor performance is increased. Additionally, since the core power consumption is proportional to the clock frequency and to the supply voltage squared, by adjusting the supply voltage to one or more cores that are performing at a slower frequency, the power consumption of these cores can be adjusted (as long as the cores meet the specified frequency requirement), thus, providing an increase in processor chip yield. Accordingly, the controller can equalize power consumption in each core, which reduces mechanical stresses due to thermal changes in a multi-core processor, as the multi-core processor is heated and cooled over time. Additionally, since the controller can adjust the power supply in real time, the performance of each core and the power consumption of each core can be adjusted in real time.

The foregoing descriptions of specific embodiments of the present invention have been presented for the purpose of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. An apparatus for optimizing performance and power consumption of a multi-core processor, comprising:
   a main controller;
   a multi-core processor including a plurality of cores, said multi-core processor being coupled to a clock source configured to provide a reference input clock frequency to said plurality of cores in said multi-core processor, each of said cores of said plurality of cores having a specification core frequency preset for said multi-core processor, and each of said cores of said plurality of cores being connected to separate supply voltage sources, each of the separate supply voltage sources being connected, in parallel, to said main controller and a voltage level-translating communication transceiver to allow individual adjustment of the separate supply voltage sources, by said main controller, for each of said cores of said plurality of cores;
   said supply voltage sources, wherein said plurality of cores has a respective operational core frequency that is proportional to said supply voltage provided by said respective supply voltage source; and
   said main controller coupled to said plurality of cores, said main controller being configured to adjust said supply voltage provided by said supply voltage source connected to said respective core to increase the supply voltage of an underperforming core of the multi-core processor in order to increase said reference input clock frequency provided to said respective core and to decrease the supply voltage of an overperforming core of the multi-core processor in order to decrease an increased power consumption resulting from the increase, wherein adjustment of either said supply voltage provided and said respective input clock frequency provided to said respective core optimizes a respective core performance and a respective core power consumption by said respective core, and wherein said main controller dynamically adjusts said supply voltage provided by said supply voltage source to said plurality of cores in real-time.

2. The apparatus according to claim 1, further comprising:
   the voltage level-translating communication transceiver configured to enable communications between said main controller and said plurality of cores and configured to enable communications between each of said plurality of cores.

3. The apparatus according to claim 2, further comprising:
   at least two PLLs (Phase Locked Loops) coupled to said multi-core processor, each of said at least two PLLs having one or more voltage-controlled oscillators (VCOs) and one or more dividers, a PLL of said at least two PLLs being configured to dynamically adjust said reference input clock frequency supplied to one or more cores of said plurality of cores in order to ensure that a respective operational core frequency of said respective core is greater than said specification core frequency preset for said respective core.

4. The apparatus according to claim 3, further comprising:
   a plurality of supply voltage sources connected to said multi-core processor, a respective individual supply voltage source of said plurality of supply voltage sources being configured to provide a respective supply voltage to an individual core of said plurality of cores, wherein said main controller dynamically adjusts said respective supply voltage provided by said respective individual supply voltage source to said individual core to increase said respective operational core frequency of said respective core, and wherein said main controller dynamically adjusts said respective supply voltage provided by said respective individual supply voltage source to said individual core in real-time mode.

5. The apparatus according to claim 4, wherein said main controller is configured to distribute instruction blocks to said plurality of cores in a manner that achieves a balancing criterion with respect to said plurality of cores, wherein said balancing criterion comprises at least one of: equal performance balancing, maximum performance balancing, power consumption balancing and instruction count balancing.

6. The apparatus according to claim 5, wherein said core performance data measured for said multi-core processor comprises computing a sum of a respective core performance data measured for each core of said plurality of cores, and wherein said core power consumption data measured for said multi-core processor comprises computing a sum of a respective core power consumption data measured for each core of said plurality of cores.

7. An apparatus for compensating semiconductor manufacturing process-induced variation in core performance of a multi-core processor, comprising:
   a main controller;
   a multi-core processor including a plurality of cores, said multi-core processor being coupled to a clock source configured to provide a reference input clock frequency to said plurality of cores in said multi-core processor, each of said plurality of cores of said multi-core processor being connected to a separate supply voltage source, each of the separate supply voltage sources being connected, in parallel, to said main controller and a voltage level-translating communication transceiver to allow individual adjustment of the separate supply voltage sources, by said main controller, for each of said cores of said plurality of cores;
   a respective power supply voltage coupled to a respective core of said plurality of cores for providing a respective supply voltage to said respective core; wherein a respective operational core frequency of said respective core is proportional to said respective supply voltage provided by said respective power supply voltage; and
   wherein said main controller is configured to adjust said respective supply voltage provided to said respective core that is underperforming in order to ensure that said respective operational core frequency of said respective core is greater than a specification core frequency preset for said respective core and to decrease the supply voltage of an overperforming core of the multi-core processor in order to decrease an increased power consumption resulting from the increase to optimize said power consumption by said respective core.

8. The apparatus according to claim 7, further comprising:
   the voltage level-translating communication transceiver configured to enable communications between said main controller and said plurality of cores and configured to enable communications between each of said plurality of cores.

9. The apparatus according to claim 8, further comprising:
a phase locked loop (PLL) circuit coupled to said each core of said plurality of cores, said PLL circuit having one or more voltage-controlled oscillators (VCOs) and one or more dividers, said PLL circuit being configured to dynamically adjust said reference input clock frequency provided to said respective core of said plurality of cores, wherein said PLL circuit further comprises one or more voltage-controlled oscillators (VCOs) and one or more dividers, wherein said PLL circuit having said one or more VCOs and said one or more dividers is configured to dynamically adjust said reference input clock frequency provided to said respective core to ensure that said respective operational core frequency of said respective core is at least equal to said reference input clock frequency.

10. The apparatus according to claim 9, wherein said main controller dynamically adjusts said respective supply voltage provided by said respective power supply voltage to said respective core in real-time mode.

11. The apparatus according to claim 10, wherein said main controller is configured to distribute instruction blocks to said plurality of cores in a manner that achieves a balancing criterion with respect to said plurality of cores, and wherein said balancing criterion comprises at least one of: equal performance balancing, maximum performance balancing, power consumption balancing and instruction count balancing.

12. The apparatus according to claim 11, wherein said core performance data measured for said multi-core processor comprises computing a sum of said respective core performance data measured for said each core of said plurality of cores, and wherein said core power consumption data measured for said multi-core processor comprises computing a sum of a respective core power consumption data measured for each core of said plurality of cores.

13. A method for optimizing performance and power consumption of a multi-core processor, said method comprising the steps of:
providing a multi-core processor having a plurality of cores, said multi-core processor receiving a reference input clock frequency to said plurality of cores in said multi-core processor;
connecting, in parallel, a separate supply voltage for each core of said plurality of cores to a same controller and a voltage level-translating communication transceiver, wherein the same controller and the voltage level-translating communication transceiver are configured to control a respective supply voltage to said each core of said plurality of cores in said multi-core processor, wherein a respective core operational clock frequency is proportional to said respective supply voltage provided to a respective core, and wherein a respective core power consumption by said respective core is proportional to said reference input clock frequency and to said respective supply voltage squared; and
adjusting, using said main controller, said respective supply voltage provided to said respective core of said plurality of cores, and said reference input clock frequency provided to said respective core of said plurality of cores that is underperforming, based on a respective core performance data and a respective core power consumption data collected for said respective core of said plurality of cores, wherein adjustment of said respective power provided to said respective core ensures that said respective operational core frequency of said respective core is greater than a respective specification core frequency preset for said respective core, and wherein adjustment of said reference input clock frequency ensures that said respective operational core frequency of said respective core is at least equal to said reference input clock frequency, and to decrease the supply voltage of an overperforming core of the multi-core processor in order to decrease an increased sower consumption resulting from the increase.

14. The method according to claim 13, further comprising the step of:
enabling, utilizing the voltage level-translating communication transceiver, communications between said main controller and said plurality of cores and enabling communications between each of said plurality of cores.

15. The method according to claim 14, wherein said adjusting step further comprises the step of:
supplying each core of said plurality of cores with at least one PLL (Phase Locked Loop) having one or more voltage-controlled oscillators (VCOs) and one or more dividers, said at least one PLL with said one or more VCOs and said one or more dividers being configured to dynamically adjust said input clock frequency provided to said respective core, wherein said respective operational core frequency is at least equal to said reference input clock frequency, and wherein said respective power consumption by said respective core is adjusted.

16. The method according to claim 15, wherein said adjusting step further comprises the step of:
dynamically adjusting either said output power supply voltage or said input clock frequency provided to said respective core in real-time mode.

17. The method according to claim 16, wherein said adjusting step further comprises the step of:
distributing, using said main controller, instruction blocks to said each core of said plurality of cores in a manner that achieves a balancing criterion with respect to said plurality of cores, wherein said balancing criterion comprises at least one of: equal performance balancing, maximum performance balancing, power consumption balancing and instruction count balancing.

18. The method according to claim 17, wherein a core performance data measured for said multi-core processor comprises computing a sum of said respective core performance data measured for said each core of said plurality of cores in said multi-core processor, and wherein said core power consumption data measured for said multi-core processor comprises computing a sum of a respective core power consumption data measured for each core of said plurality of cores.

* * * * *